United States Patent
Franssen et al.

[11] Patent Number: 6,064,819
[45] Date of Patent: May 16, 2000

[54] CONTROL FLOW AND MEMORY MANAGEMENT OPTIMIZATION

[75] Inventors: Frank Franssen, Leuven; Michael van Swaaij, Roy; Lode Nachtergaele, Zwevegem; Hans Samsom, Leuven; Francky Catthoor, Temse; Hugo De Man, Leuven, all of Belgium

[73] Assignee: Imec, Belgium

[21] Appl. No.: 08/827,883

[22] Filed: Apr. 2, 1997

Related U.S. Application Data

[63] Continuation of application No. 08/163,819, Dec. 8, 1993, abandoned.

[51] Int. Cl.[7] ........................................ G06F 9/45
[52] U.S. Cl. ............................................ 395/709
[58] Field of Search .................... 395/705, 707, 395/709

[56] References Cited

U.S. PATENT DOCUMENTS

| | | | |
|---|---|---|---|
| 3,694,813 | 9/1972 | Loh et al. | 395/800 |
| 3,891,836 | 6/1975 | Lee | 364/132 |
| 3,916,383 | 10/1975 | Malcom | 395/650 |
| 3,969,698 | 7/1976 | Bollinger et al. | 382/225 |
| 4,177,514 | 12/1979 | Rupp | 395/800 |
| 4,463,372 | 7/1984 | Bennett et al. | 348/580 |
| 4,803,416 | 2/1989 | Abiven et al. | 320/44 |
| 5,021,945 | 6/1991 | Morrison et al. | 395/375 |
| 5,175,856 | 12/1992 | Van Dyke et al. | 395/700 |
| 5,179,702 | 1/1993 | Spix et al. | 395/650 |
| 5,195,172 | 3/1993 | Elad et al. | 395/50 |
| 5,216,593 | 6/1993 | Dietrich et al. | 364/402 |
| 5,287,511 | 2/1994 | Robinson et al. | 395/700 |
| 5,321,773 | 12/1991 | Kopec et al. | 382/209 |
| 5,323,010 | 6/1994 | Gratton et al. | 250/458.1 |
| 5,379,231 | 1/1995 | Pillage et al. | 364/488 |
| 5,398,303 | 3/1995 | Tanaka | 395/51 |
| 5,459,739 | 10/1995 | Handley et al. | 371/36 |
| 5,471,408 | 11/1995 | Takamoto et al. | 364/578 |

OTHER PUBLICATIONS

Franssen et al., "Modeling Multidimensional Data and Control Flow," IEEE Trans. on VLSI Systems, vol. 1, Iss. 3, pp. 319–327, Sep. 1993.

Van Swaaij et al., "Automating High Level Control Flow Transformations for DSP Memory Management," IEEE, NY, Proc. of IEEE Workshop on VLSI Sig. Proc., pp. 397–406, Oct. 28, 1992.

F.Balasa, "Formal Methodology for Linear Type Data Dependence Analysis", *IMEC Res. Report*, 1992.

F. Balasa, F.Catthoor, H.De Man, "Exact Evaluation of Memory Size for Multi–dimensional Signal Processing Systems", accepted for *IEEE Int'l Conf. Computer–Aided Design*, Santa Clara CA, Nov. 1993.

U.Banerjee, R.Eigenmann, A.Nicolau, D.Padua, "Automatic Program Parallelization", *Proc. of the IEEE*, invited paper, vol.81, No.2, Feb. 1993.

A.Benaini, P.Quinton, Y.Robert, Y.Saouter, B.Tourancheau, "Synthesis of a New Systolic Architecture for the Algebraic Path Problem", *Science of Computer Programming*, vol.15, pp.135–158, 1990.

(List continued on next page.)

*Primary Examiner*—Emanuel T. Voetz
*Assistant Examiner*—Peter J. Corcoran, III
*Attorney, Agent, or Firm*—Knobbe, Martens, Olson & Bear, LLP

[57] ABSTRACT

Selected code is modeled in a polyhedral dependency graph (PDG). A placement optimizer maps each element of the PDG to an optimally placed PDG. An ordering optimizer maps the placed PDG to an optimally ordered PDG. The PDG, place PDG, and ordered PDG are combined to produce a transformation script. The transformation script is applied to the selected specification description to produce optimized selected code. Optimized selected code is combined with original code to generate a control-flow optimized code. In addition, memory directives are derived from the ordered PDG model. The memory directives and optimized code are used to generate target code for simulation or software compilation.

78 Claims, 13 Drawing Sheets

OTHER PUBLICATIONS

J.Buck, S.Ha, E.Lee, D.Messerschmitt, "Ptolemy: A Framework for Simulating and Prototyping Heterogeneous Systems", *Proc. European Simulation Conf.*, invited paper, Copenhagen, Denmark, Aug. 1992.

F.Catthoor, H.De Man, "Application–Specific Architectural Methodologies for Hign–Throughput Digital Signal and Image Processing", *IEEE Trans, on Acoustics, Speech and Signal Processing*, vol.38, No.2, pp. 339–349, Feb. 1990.

A.Darte, T.Rissett, R.Robert, "Loop Nest Scheduling and Transformations", *Environments and Tools for Parallel Scientific Computing*, J.J. Dongara, et al., editors, North Holland, 1993.

H.De Man, F.Catthoor, G.Goossens, J.Vanhoof, J.Van Meerbergen, S.Note, J.Huisken, "Architecture–Driven Synthesis Techniques for VLSI Implementation of DSP Algorithms", *epecial issue on Computer–aided Design of Proc of the IEEE*, vol. 78, No. 2, pp.319–335, Feb. 1990.

P.Feautrier, "Dataflow Analysis of Array and Scalar References", *Int'l J. of Parallel Programming*, vol.20, No.1, pp. 23–53, Feb. 1991.

F.Franssen, M.van Swaaij, F.Catthoor, H.De Man, "Modeling Piece–wise Linear and Data dependent Signal Indexing for Multi–dimensional Siganl Processing", *Proc. 6th Int'l Workshop on High–Level Synthesis*, Laguna Beach, CA, Nov. 1992.

F. Franssen, F.Balasa, M.van Swaaij, F.Catthoor, H.De Man, "Modeling Multidimensional Data and Control Flow", accepted for *IEEE Trans on VLSI Systems*, Sep. 1993.

D.Genin, P.Hilfinger, J.Rabaey, C.Scheers, H.De Man, "DSP Specification Using Silalge Language" *Proc. Int'l Conf. on Acoustics, Speech and Signal Processing*, Albuquerque, NM. pp. 1057–1060, Apr. 1990.

G.Goossens, J.Rabaey, J.Vandewalle, H.De Man, "An Efficient Microcode Compiler for Application Specific DSP Processors", *IEEE Trans. on Computer–Aided Design,,* vol.9, No.9, pp.925–937, Sep. 1990.

D.Grant, P.Denyer, I.Finlay, "Synthesis of Address Generators", *Proc. IEEE Int'l Conf. on Computer–Aided Design*, Santa Clara, CA, pp. 116–119, Nov. 1989.

J.Kunkel, "COSSAP: A Stream Driven Simulator", *IEEE Int'l Workshop on Microelectronics in Communications*, Interlaken, Switzerland, Mar. 1991.

F.Kurdahi, A.Parker, "Real: A Program for REgister ALlocation", *Proc. 24th ACM/IEEE Design Automation Conf.*, Miami, FL, pp.210–215, Jun. 1987.

D.Lanneer, "Design Models and Data–Path Mapping for Signal Processing Architectures", *Ph.D. Thesis*, ESAT, K.U.Leuven, Belgium, Mar. 1993.

J–H.Lee, Y–C.Hsu, Y–L.Lin, "A New Integer Linear Programming Formulation for the Scheduling Problem in Data Path Synthesis", *EDAC/IEEE*, 1989.

P.Le Guernic, A.Benveniste, P.Bournai, T.Gautier, "Signal—A Data Flow–Oriented Language for Signal Processing", *IEEE Trans. on Acoustics, Speech, and Signal Processing*, vol.ASSP-34, No.2, pp.362–374, Apr. 1986.

W.Li, K.Pingali, "A Singular Loop Transformation Framework Based on Non–singular Matrices", *Proc. 5th Annual Workshop on Languages and Compilers for Parallelism*, New Haven, Aug. 1992.

P.Lippens, J.van Meerbergen, A.van der Werf, W.Verhaegh, B.McSweeney, J.Huisken, O.McArdle, "PHIDEO: A silicon Compiler for High Speed Algorithms", *Proc. European Design Autom. Conf.*, Amsterdam, The Netherlands, pp.436–441, Feb. 1991.

D.Loveman, "Program Improvement by Source–to–Source Transformation", *J. of the ACM*, vol.24, No.1, pp.121–145, Jan. 1977.

M.McFarland, A.Parker, R.Camposano, "The High–Level Synthesis of Digital Systems", *special issue on Computer–Aided Design in Proc. of the IEEE*, vol.78, No.2, pp.301–318, Feb. 1990.

D.Moldovan, "Tradeoffs Between Time and Space Characteristics in the Design of Systolic Arrays", *Proc. IEEE Int'l Symp. on Circuits and Systems*, Kyoto, Japan, pp.1685–1688, Jun. 1985.

L.Nachtergaele, I.Bolsens, H.De Man, "A Specification and Simulation Front–End for Hardware Synthesis of Digital Signal Processing Applications", *special issue on Simulatio of Highly Paralled Systems in Int'l J. of computer Simulation*, 1992.

A. Nicolau, "Loop Quantization: A Generalized Loop Unwinding Technique", *J. of Parrallel and Distributed Computing*, vol. 5, pp. 568–586, 1988.

D. Padua, M. Wolfe, "Advanced Compiler Optimizations for Supercomputer," *special issue of Communications of the ACM*, vol. 29, No. 12, pp. 1184–1201, Dec. 1986.

P. Pöchmuller, N. Wehn, M. Glesner, "Automatic Synthesis for Mechatronic Applications", *Application–Driven Architecture Synthesis*, F.Catthoor, L. Svensson (eds.), Kluwer Boston, pp. 167–190, 1999.

C. Polychronopoulos, Compiler Optimizations for Enhancing Parallelism and Their Impact on Architectur Design:, *IEEE Trans. on Computers*, vol. 37, No. 8, pp. 991–1004, Aug. 1988.

W. Pugh, "The Omega Test: A Fast and Practical Integer Programming Algorithm for Dependence Analysis", *Proc. Supercomputing '91*, Nov. 1991.

P. Quinton, V.Van Dongen, "The Mapping of Linear Recurrence Equations on Regular Arrays", *J. of VLSI Signal Processing*, vol. 1, Kluwer, Boston, pp. 95–113, 1989.

H. Sansom, L. Claesen, H. De Man, "SynGuide: An Environment for Doing Interative Correctness Preserving Transformations", *Accepted for IEEE workshop on VLSI Signal Processing*, Veldhoven, The Netherlands, Oct. 1993.

L. Stok, J.A.G. Jess, "Foreground Memory Management in Data in Path Synthesis", *Int'l J. of Circuit Theory and Applications*, vol. 20, pp. 235–255, 1992.

I. Verbauwhede, F. Catthoor, J. Vandewalle, H. De Man, "Background Memory Synthesis for Algebraic Algorithms on Multi–Processor DSP Chips", *Proc. VLSI '89, Int'l Conf. on VLSI* , Munich, Germany, pp. 209–218, Aug. 1989.

L. Van Gool, J. Wagemans, A. Oosterlinck, "Regularity Detection as a Strategy in Object Modeling and Recognition", *SPIE Applications of Artificial Intelligence VII*, vol. 1095, pp. 138–149, 1989.

J. Vanhoof, I. Bolsens, H. De Man, "Compiling Multi–Dimensional Data Streams into Distributed DSP ASIC Memory", *Proc. IEEE Int'l Conf. on Computer–Aided Design*, Santa Clara, CA, pp. 272–275, Nov. 1991.

M.van Swaaij, F.Franssen, F.Cathoor, H.DeMan, "Modeling Data Flow and Control Flow for High Level Memory Management", *Proc. IEEE Workshop on VLSI Signal Processing*, Oct. 1992.

M. van Swaaij, F. Franssen, F. Catthoor, H. De Man, "Automating High Level Control Flow Transformations for DSP Memory Management", *Proc. IEEE Workshop on VLSI Signal Processing*, Oct. 1992.

M. van Swaaij, F. Franssen, F. Catthoor, H. De Man, "Modeling Data Flow and Control Flow for DSP Systems Synthesis", *VLSI Design Methodologies for AArchitectures and Applications*, M. Bayoumi (ed.), Kluwer, Boston, 1993.

M. Wolfe, U. Banerjee, "Data Dependence and Its Application to Parallel Processing", *Int'l J. of Parallel Programming*, vol. 16, No. 2, pp. 137–178, 1987.

M. Wolfe, "Data Dependence and Program Restructuring", *The J. Supercomputing*, vol.4, Kluwer, Boston, pp. 321–344, 1990.

$$f_{33}(x) = \begin{bmatrix} 0 & 1 \\ 1 & 0 \end{bmatrix} x + \begin{bmatrix} -1 \\ 0 \end{bmatrix} \qquad 340$$

$$P_{opnd} = \begin{bmatrix} 0 & 1 \\ 0 & -1 \\ 1 & 0 \\ -1 & 0 \end{bmatrix} x \geq \begin{bmatrix} 0 \\ -(N-1) \\ 0 \\ -P \end{bmatrix} \qquad 342$$

$$P_{def} = \begin{bmatrix} 0 & 1 \\ 0 & -1 \\ 1 & 0 \\ -1 & 0 \end{bmatrix} x \geq \begin{bmatrix} 0 \\ -N \\ 0 \\ -P \end{bmatrix} \qquad 344$$

*FIG. 13*

CONTROL FLOW AND MEMORY MANAGEMENT OPTIMIZATION

This application is a continuation of U.S. patent application Ser. No. 08/163,819, filed Dec. 8, 1993, now abandoned.

BACKGROUND OF THE INVENTION

1. Field of the Invention

The invention relates to control flow and memory management optimization, and more particularly to control flow which is optimized in a digital system-level description for faster system simulation and for storage requirements within hardware or software design implementation/synthesis.

2. Description of the Background Art

Many real-time multi-dimensional signal processing (RMSP) algorithms, such as those used in speech, image, and video processing, front-end telecom, and numerical computing systems, exhibit a large amount of control flow, including many loops, and multi-dimensional signals. This is especially so if the applications are described in an applicative or functional way using conventional computer languages like Silage, Signal, or even the industrial standards VHDL and Verilog. The presence of multi-dimensional (M-D) signals and complex nested loops in these applications heavily affects the memory cost for the final hardware (architecture) realization. This leads to a severe memory bottleneck when such algorithms have to be mapped from a behavioral specification into some realization.

A similar problem occurs in mapping applications on predefined instruction-set processors or when the system designer wants to verify his initial RMSP specification by means of pseudo-exhaustive (software-based) simulation on a workstation or (parallel) digital signal processing (DSP) board. Here, the limitations on available memory size and bandwidth require a careful study of the memory organization for RMSP. The available (physical) memory on the processor in the personal computer, workstation, or emulation board is generally insufficient to contain all the intermediate signals. As a result, swapping will occur which heavily influences the elapsed time for the simulation.

Hence, for both hardware and software, the most dominant effect on area and power related to the processing of N-bit multi-dimensional data or signals lies in the memory organization. Memory is a major cost issue when such a specification is mapped on (application-specific) hardware with traditional synthesis techniques. Generally, between 50 and 80% of the area cost in customized architectures for RMSP is due to memory units, i.e., single or multi-port random access memories (RAMs), pointer-addressed memories, and register files.

In terms of power consumption, the transfer count directly influences the number of transitions of the large capacity induced by the path between the "arithmetic processing" and the memory. The maximal number of words alive directly relates to the memory size (and thus area) but indirectly also influences power consumption because the capacitive load, which toggles every transition, will increase at least proportionally to the memory size. This direct memory related cost involves a large part of the total power cost in most systems. Indirectly, this factor becomes even larger when the effect on the clock distribution network is incorporated.

The problem of excessive memory use is not unique for applicative specification languages. It applies equally well for non-optimized procedural specifications in languages such as C, Fortran, Pascal, procedural VHDL.

With these problems in mind, it is important to reduce the size of the M-D signal storage in physical memory during system-level hardware synthesis, software compilation, and simulation/emulation. When describing an algorithm involving multi-dimensional signals in a non-procedural (applicative) language, such as Silage, or equivalently, when a complete optimized ordering of the original description is not provided by the designer, optimizing memory management becomes theoretically untractable. One way of solving the problem under-these constraints is by means of an accurate data-flow analysis preceding the storage minimization. These methods lie in the domain of optimizing (parallel) compiler theory. However, the published methods handle only the detection of the dependencies, because in parallelism detection, a simplified data-flow analysis providing a "yes/no" answer is sufficient. In contrast, minimizing the total storage cost requires knowledge about the exact number of dependencies. Consequently, besides the qualitative aspects, the data-flow analysis must be provided with quantitative capabilities. Moreover, the compiler approaches are not sufficient for many irregular image and speech processing applications. Finally, the compiler oriented approaches have not investigated automated steering mechanisms to modify the control flow in order to arrive at a better description, e.g., with lower storage requirement. The latter task is even more difficult than the data-flow analysis as such.

Memory problems also exist in RMSP compilation from the system-level specification description (e.g., Silage) to a target language (e.g., C). Generally a compiled-code technique gives rise to much better results for RMSP evaluation than event-driven simulators. Unfortunately, it requires a preprocessing step involving data flow analysis which is very complex for true M-D signals. The few existing memory management approaches that deal with the compilation of (applicative) RMSP specifications are based on explicit unrolling of loops to turn them into standard scalar compilation, or a preprocessing step based on symbolic simulation to analyze the dependencies. The former approach is not sufficient to Handle even medium-size loop nests. The latter does not require the execution of the actual operations on the signals, but only the investigation of the production (in the left hand side of a definition) and consumption (in the right hand side of a definition) of signals. This may be effective for some audio, speech, and telecom applications but becomes a problem when the loop depth increases beyond three and when the iterator range exceeds a few hundred, as occurs in image and video processing.

In a high-level synthesis context, little work has been performed in the area of memory management for M-D signals. Efforts in this field have concentrated on memory allocation and in-place storage, and on address cost reduction. The conventional schemes have focused on the execution of the individual loop transformations based on M-D data-flow analysis, on foreground register allocation, on system simulators intended for applications where the loops can be (implicitly) unrolled, or on the actual memory allocation/in-place storage reduction/address generation tasks for background memories. In the PHIDEO Scheduler only the starting times for the statements are optimized for data-path and memory cost during scheduling whereas the periods and the lengths of the original stream signals remain unaffected. See, P. Lippens, J. van Meerbergen, A. van der Werf, W. Verhaegh, B. McSweeney, J. Huisken, O. McArdle, "PHIDEO: a silicon compiler for high speed algorithms", Proc. European Design Autom. Conf., Amsterdam, The Netherlands, pp.436–441, February 1991. Global control flow optimizations intended to reduce the total memory cost for application-specific architectures have not been addressed.

SUMMARY OF THE INVENTION

The illustrated embodiment of the present invention derives a correct procedural ordering for a real-time signal processing specification description (without expanding code to scalars). In addition, the invention optimizes loop organization, thus leading to an acceptable amount of memory within a system-level simulation and/or software/hardware synthesis environment.

According to the illustrated embodiment of the invention, a specification description is modeled in a polyhedral dependency graph (PDG). The placement of the elements in the PDG (i.e., node domains, and polytope inequalities representing the operation and definition spaces of the node domain) is optimized. A series of affine transformation functions map each element of the PDG to a placed PDG. An optimal ordering vector is derived and transforms the placed PDG into an ordered PDG. The PDG, placed PDG, and ordered PDG are combined to produce a transformation script. The transformation script is applied to the selected specification description and combined with the original specification description to generate a control-flow optimized specification description. The global control flow optimization derived in accordance with the present invention can lead to active memory area savings of several orders of magnitude when compared to the memory cost involved in the initial specification description.

The illustrated embodiment of the invention also addresses the memory-related problem in RMSP compilation from the system-level specification environment to a target language (e.g., from Silage to C). According to the invention, memory directives are derived from variable life-time data and other characteristics of the ordered PDG model. The memory directives and optimized specification description are used to generate target code for simulation and/or software compilation and execution on processor. The current invention can handle very large applications, involving several nested loops and a multitude of M-D signals, in reduced CPU processing times.

BRIEF DESCRIPTION OF THE DRAWINGS

FIG. 13 is a chart illustrating the intra dependency relationhips for node 3 of FIG. 12.

DESCRIPTION OF THE PREFERRED EMBODIMENT

Figure 1:
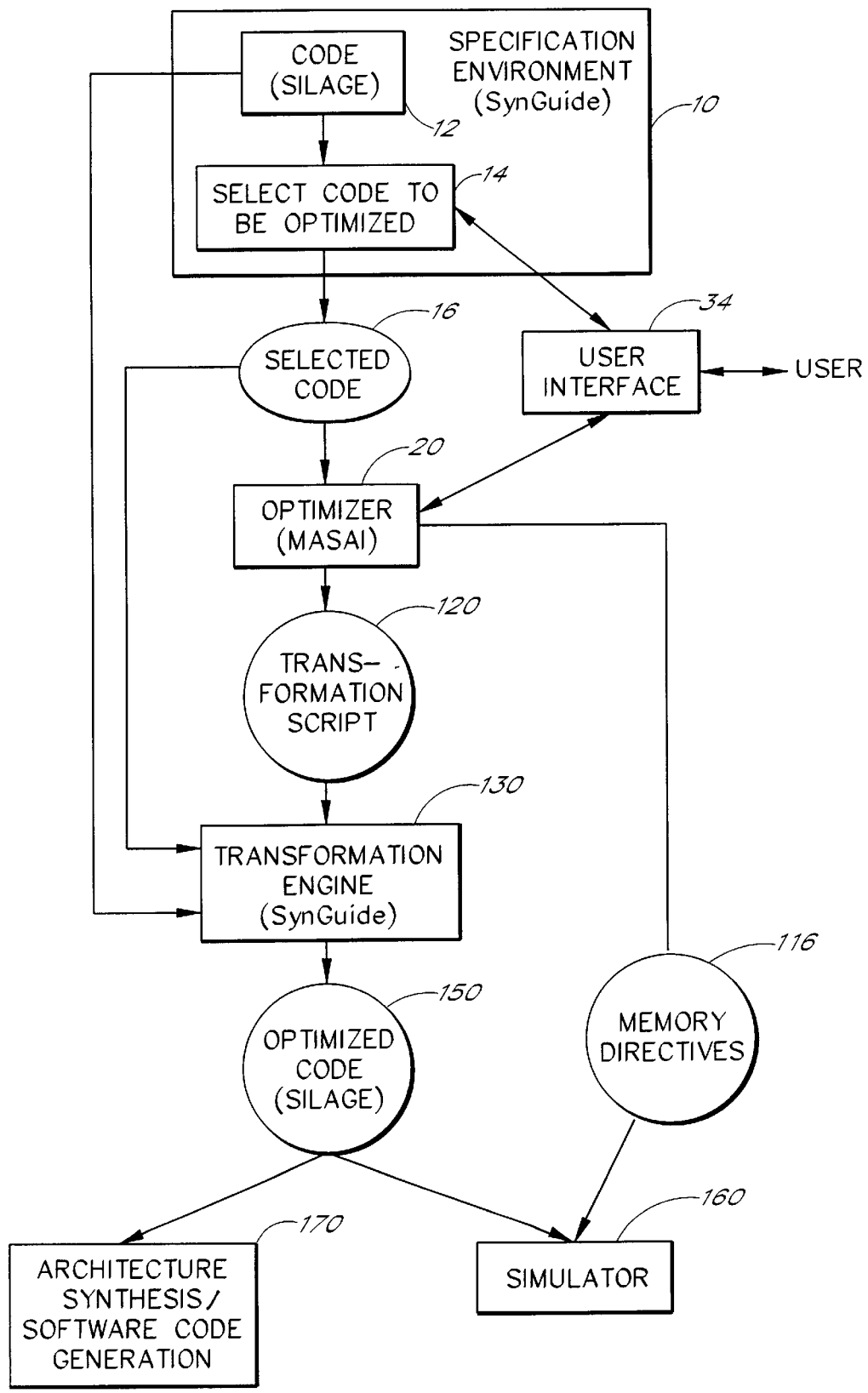
FIG. 1 is a high-level system flowchart illustrating the optimizer in the present invention.

FIG. 1 is a top-level flowchart illustrating the optimizer system of the present invention. Specification environment (10) is used to create a specification description (12) or code. In one embodiment, the specification description is given in Silage code. However, the method can be used with any real-time processing oriented system specification language which serves as input for a simulation, software compilation, and/or hardware synthesis environment. This applies in particular for Data Flow Language (DFL) and for behavioral VHDL or Verilog (the standard behavioral description languages in the electronic design industry), or any other language that makes the multi-dimensional (M-D) signal data-flow explicit in the initial description. The method could also be adapted for fully procedural specification languages like C, Pascal, Fortran, procedural DFL or VHDL. The specification description may be, for example, a signal processing specification or a numerical processing specification. The invention can be used with partly irregular non-uniform descriptions, and with piece-wise linear and data-dependent indexing.

Figure 10:
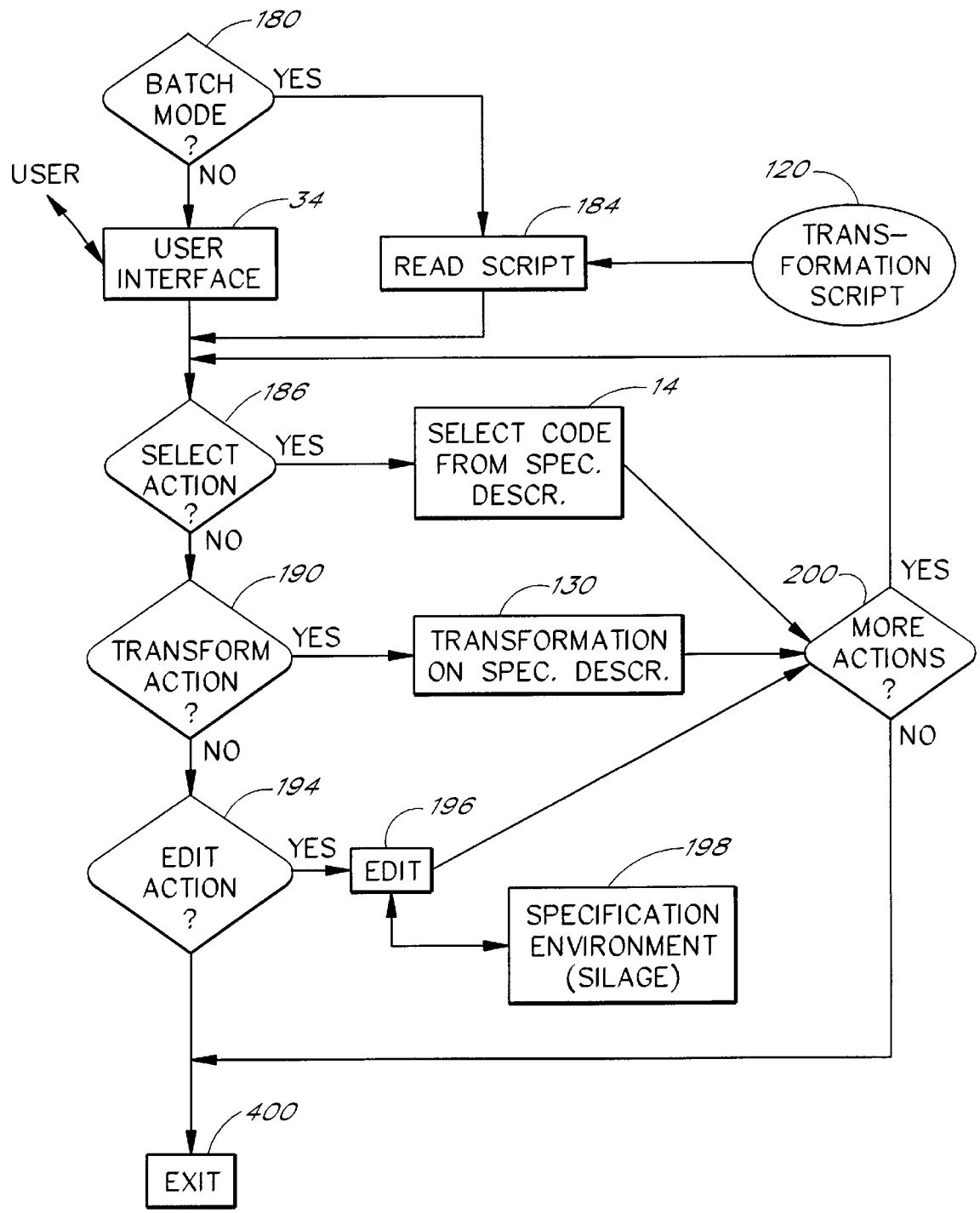
FIG. 10 is a flowchart illustrating one embodiment of a combined transformation engine step and code selection step in FIG. 1.

A particular portion (16) of the specification description (12) is selected (14) by the user (34) to be optimized. In one embodiment, the selection (14) is made interactively by the user (34) in a system known as SynGuide as shown in FIG. 10. Selection of a portion of the specification description (16) could also be perfomed in an automated fashion by a tool (14) which identifies the part of the specification description (12) to be optimized (16). The selected code (16) is sent to the optimizer (20). In one embodiment, the optimizer (20) is a known as MASAI. The optimizer (20) produces a transformation script (120) that is interpreted by the transformation engine (130) which applies the transformation script (120) to the selected code (16). The transformation engine (130) produces an optimized specification description (150) which can be used, for example, in architecture synthesis/software code generation (170) and/or in a compiled code simulator (160).

Figure 2:
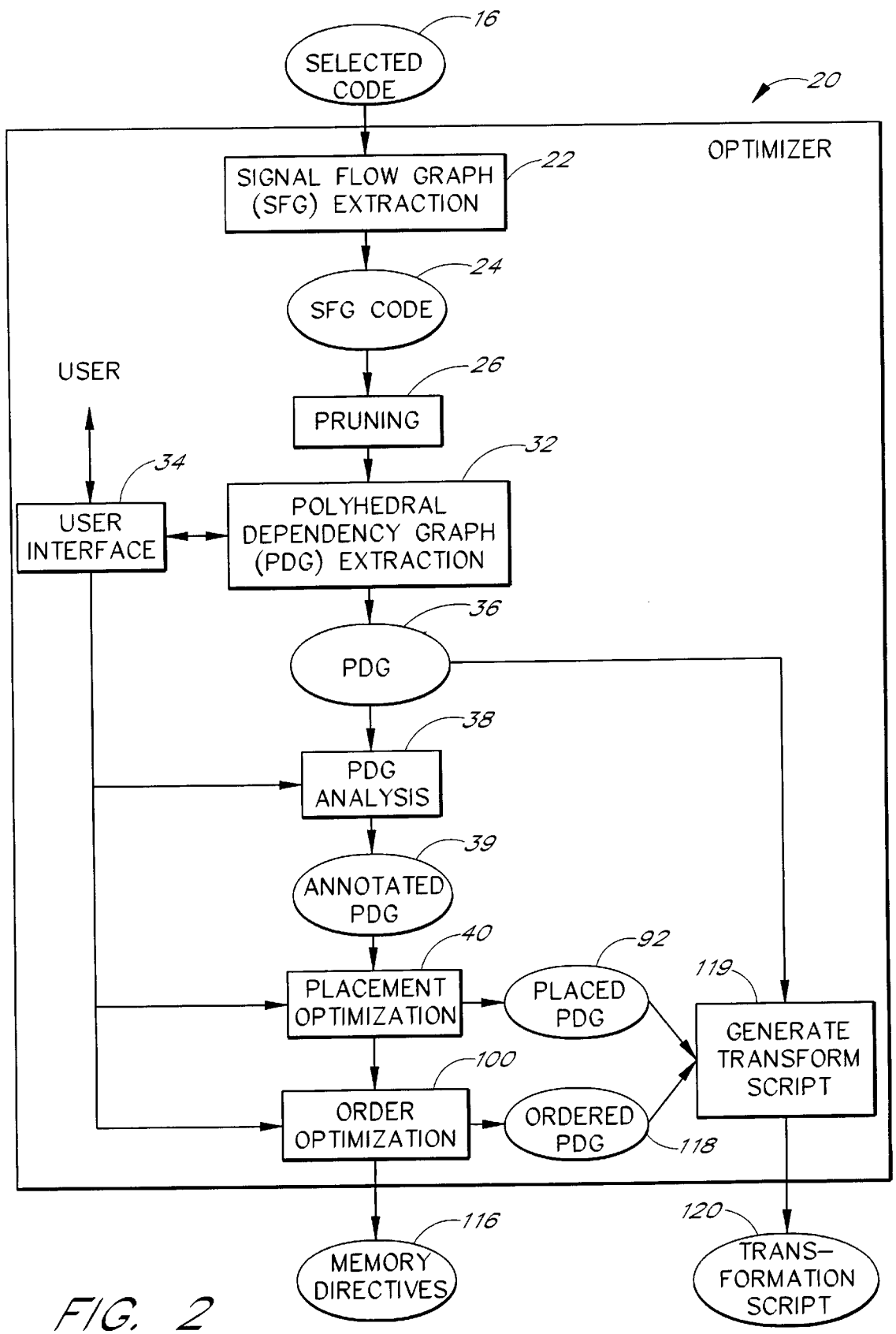
FIG. 2 is a high-level flowchart illustrating the optimizer shown in FIG. 1.
Figure 3:
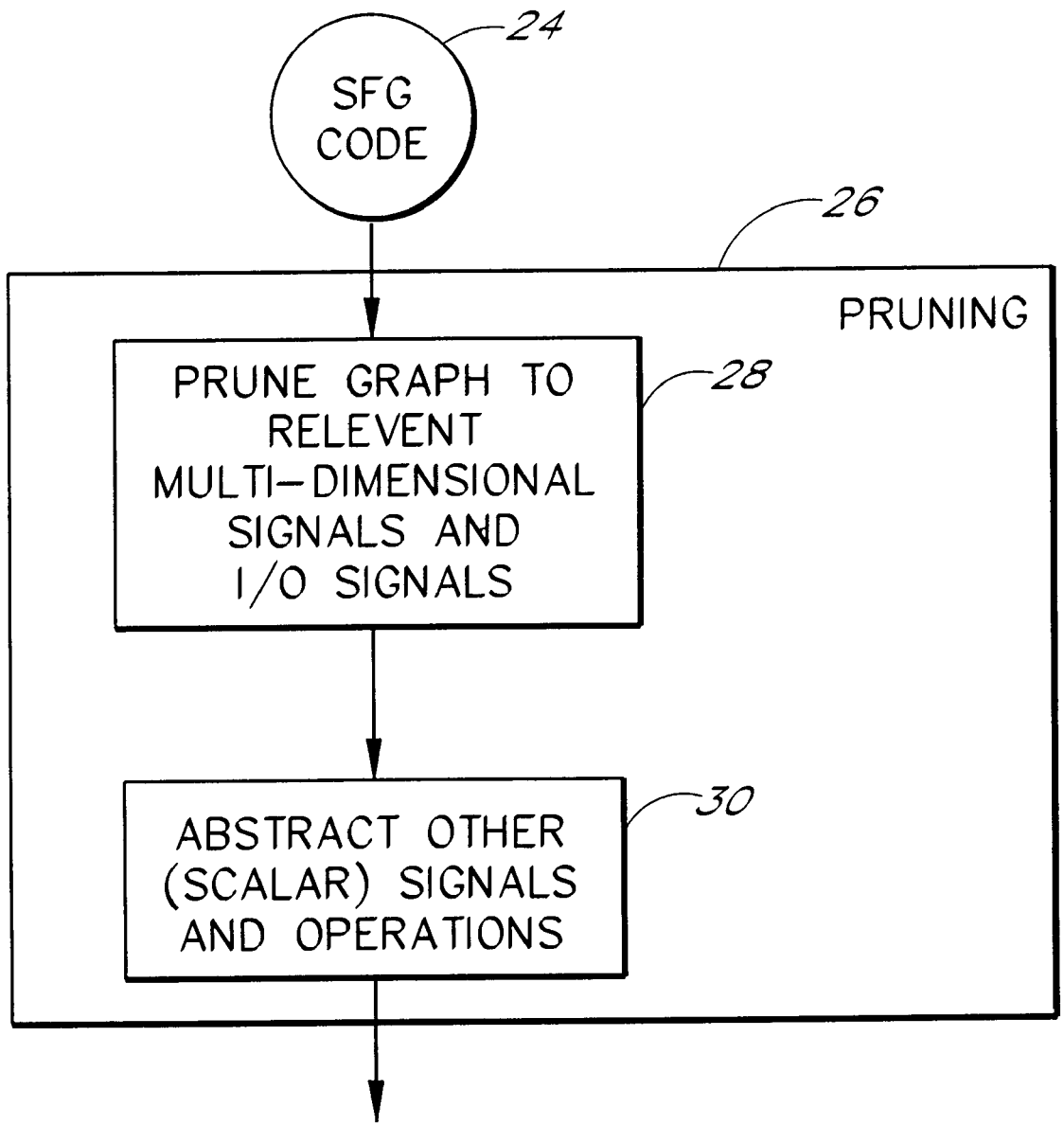
FIG. 3 is a flowchart illustrating the pruning process in the optimizer system shown in FIG. 2.

Referring to the flowchart of FIG. 2, in one embodiment, a Signal Flow Graph (SFG) (22) is extracted from the selected code (16). The SFG may be a conventional SFG (see, for example, D. Lanneer, "Design models and data-path mapping for signal processing architectures", Ph.D. Thesis, ESAT, K. U. Leuven, Belgium, March 1993). Other languages that allow the derivation of the data flow may also be used with the present invention. In one embodiment this task is performed by the Silage-to-SFG (S2S) extractor. The SFG (22) is pruned (26) to include only the M-D signals and I/O signals (28). Scalar signals, and the operations performed on any of the signals, are abstracted (30) and other tasks that reduce the problem size (i.e., the size and complexity of the Polyhedral Dependency Graph (PDG) (32) that is generated (36)) may be performed in this step. Optionally the sample delays in the selected code (16) are also modeled in the SFG (22).

A PDG model (36) is extracted (32) from the pruned SFG (26). A description and example of PDG extraction are given herein. More detailed information about the PDG extraction task is found in Chapter 5 of M.F.X.B. van Swaaij. "Data flow geometry: Exploiting regularity in system-level synthesis", *Ph.D. Thesis, ESAT, K. U. Leuven*, Belgium, December, 1992, as appended hereto (see Appendix A). This task includes the extension of node domain (46) dimensions which is needed whenever domains are being placed in a common node space (92) of higher dimensionality. Based on this model, it is then possible to manipulate node space polytopes, taking into account the dependencies in order to arrive at not only a valid execution order, but an optimized execution order taking into account memory requirements.

Due to the presence of millions and even billions of scalar signals (e.g., in image and video processing applications), data-flow analysis operating with groups of signals rather than individual signals is preferred. This is possible for a very general class of RMSP applications by using an extended polyhedral dependence graph (PDG) (36) model, see F. Franssen, F. Balasa, M. van Swaaij, F. Catthoor, H. De Man, "Modeling Multi-Dimensional Data and Control flow", accepted for *IEEE Trans. on VLSI systems*, 1993. See also Ch. 5 of M. van Swaaij's Ph.D. Thesis, as appended hereto. In this PDG model (36), groups of operations are represented by node domains (46) and M-D signals are represented by their definition and operand domains, each characterized by polytopes. The dependencies between these groups of operations are then accurately expressed by affine functions (matrices). The model is independent of the actual value of dimension parameters (such as loop bounds).

For example, the Silage code of the kernel of an auto-correlation algorithm which is part of a voice coder application may be written as:

```
(j:0..N – 1)::
begin
  a[j] = ƒ1(s[j]); node: 1
  (k:O..P)::
    begin
      b[k][j] = ƒ1(s[k + j]); node: 2
      r[k][j + 1] = r[k][j] + INT16(a[j] * b[k][j]); node: 3
    end;
end;
```

Figure 12:
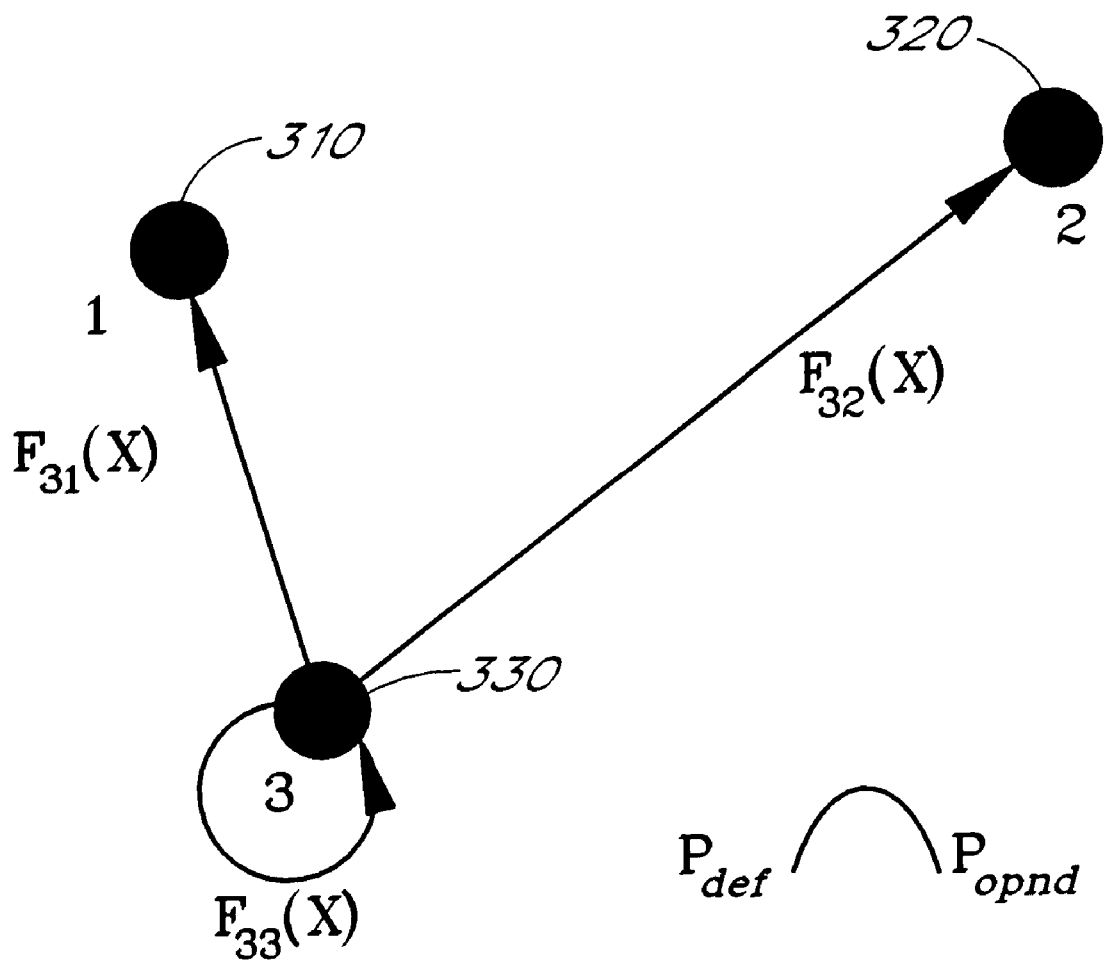
FIG. 12 is a graph illustrating the PDG of an auto-correlation data flow.

Referring to FIG. 12, the PDG (36) for this code is depicted (300). The three nodes are indicated in the Silage code and in FIG. 12 as 310, 320, 330. The affine functions f(x) on the graph edges are the result of mapping node spaces on their definition $P_{def}$ and operand spaces $P_{opnd}$. Each of these polytopes—within its space—can be mathematically denoted by a set of inequalities $Cx \geq c$ as shown in FIG. 13 for $P_{opnd}$ (342) and $P_{def}$ (344) of node 3. The relation between these two spaces is given by the affine function $f_{33}(x)$ (340).

The PDG (36) is input to the optimization step of generating a transformation script (119). This is necessary in order to relate back to a model of the original code to be optimized (16) and to extract the appropriate body-split transformation (142) (discussed below).

The PDG (36) is analyzed (38) to produce an annotated PDG (39). This task is partitioned into two sub-tasks: quantitative and structural PDG analysis, and node domain splitting. Quantitative data such as: (a) the number of node domains; (b) number of arcs between nodes; (c) node domain structure; (d) dependency structure; and, (e) number of intra- and inter-domain dependencies are derived. The first two topics are explanatory.

Node domain structure: An important observation is that the node domains of a single problem instance, between which there is a dependency, often have depending faces which are (nearly) identical, under an affine transformation with a limited unimodular transformation matrix for which $-1 \leq a_{ij} \leq 1$. If node domains have a dependency but are of different dimensionality, then the smaller dimensionality node domain is generally (in the same limited unimodular way) identical to a face of the same dimension, to which it is dependent, of the larger dimensionality node domain.

Dependency structure: The number of dependencies between a consuming node domains $P_e$ and a producing node domain is often directly proportional to the maximum of the dimension of $P_e$ and the dimension of its mapping on the operand space belonging to the signal corresponding to $P_p$. This relation can be deduced from given dependency restrictions in combination with the node domain characteristics. Furthermore, more general dependency information, like dimensionality, uniformity, affinity, broadcasting and data dependent relations, is derived. This information is used in the placement optimization (section 3.4).

Number of intra- and inter-domain dependencies: By default no exhaustive dependency count is performed because the intention of this approach is an algorithm parameter independent model and therefore also the optimization techniques that rely on it. Optionally an exact (but sometimes expensive in terms of run-time) dependency count can be performed. A dedicated algorithm based on Fourier-Motzkin elimination, for example may be used (see for example, F. Balasa, F. Catthoor, H. De Man, "Optimal Evaluation of Memory Area for Multi-dimensional Processing Systems", accepted for *IEEE Int. Conf. Comp. Aided Design*, Santa Clara Calif., November 1993). In principle every algorithm that counts integer points in a polytope can be used for this task. Note, PDG Analysis (38) can be limited or controlled by the user (34) (e.g., to skip or modify this step).

Within the PDG analysis step (38), the goal of the node domain splitting task is to split node domains in the PDG (36) that do not allow a procedural ordering caused by their intra-dependency structure. Additionally, the search space for domains that in principle do allow a procedural ordering, but have intra-dependency cones with angles larger than 90 degrees can optionally be split. Domains are split in such a way that each of the resulting domains after splitting has an intra-dependency cone that is within a single orthant, i.e., the resulting maximal angle between dependencies is 90 degrees (pointed cone). More detailed information is found in Chapter 5 of van Swaaij as appended.

The annotated PDG (39) is used in the placement optimization step (40) to produce a placed PDG (92) (described in detail below). The placed PDG (92) is used in the order optimization step (100) to produce an ordered PDG (118) (described in detail below). Memory directives (116) are also produced in the order optimization step (100). The placed PDG (92), ordered PDG (118), and the original PDG (36) are combined in step (119) to produce a transformation script (120). Here (119) various types of transformations (132, 136, 140, 144) are formed from the given input as described below with reference to FIG. 8.

Figure 9:
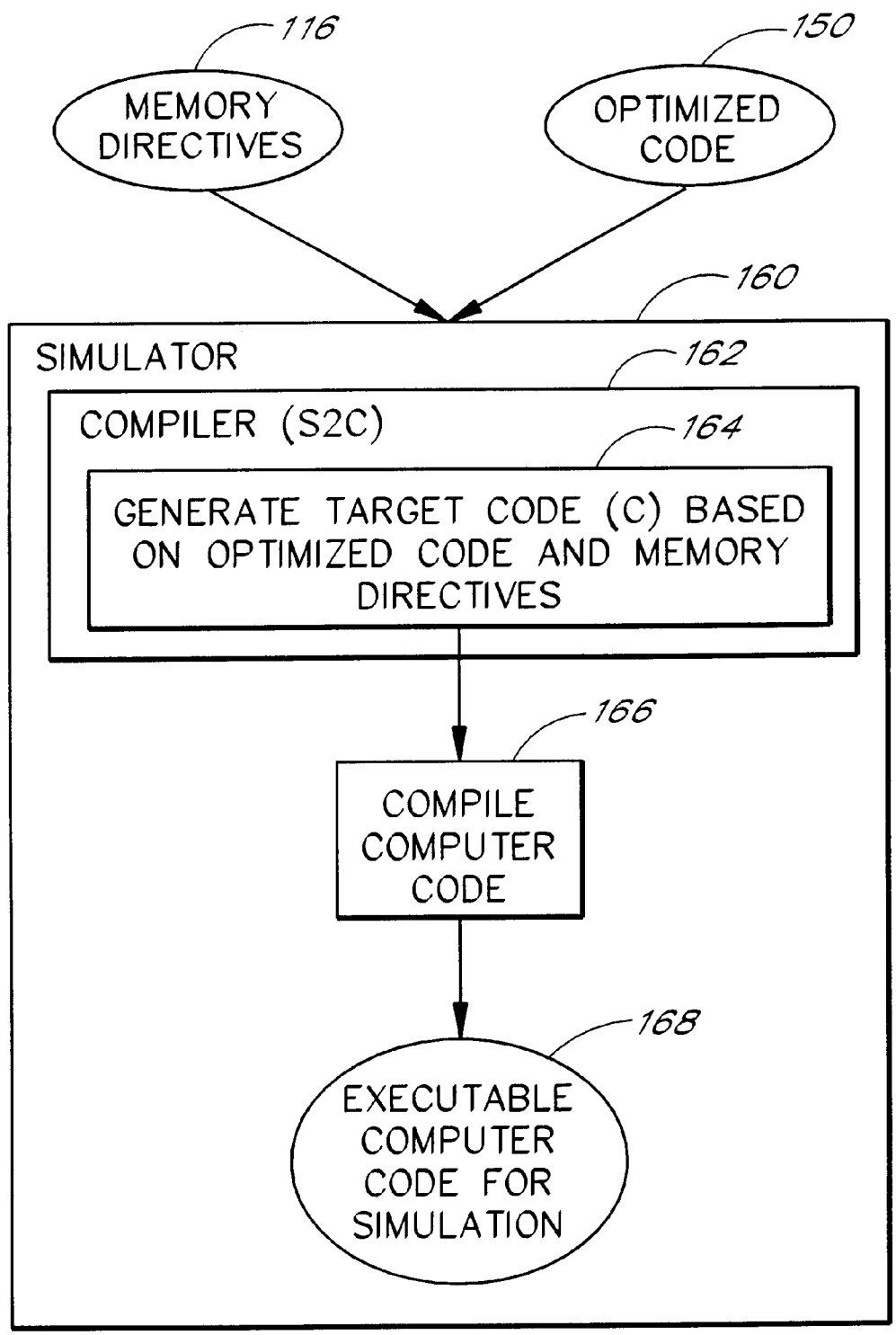
FIG. 9 is a flowchart illustrating one embodiment of the use of the optimized description produced by the optimizer in FIG. 1 in a compiled code simulator.

Referring to the flowchart of FIG. 9, the optimized code (150) is used, for example, in architecture synthesis (170, FIG. 1) and/or in a compiled code simulator (160). Target code (e.g., C) can be produced (162, 164) using the memory directives (116) generated by the optimization step (20). The target code (164) can be compiled (166) and, for example, executed or used in a standard chip solution for the original specification description (12).

Figure 4:
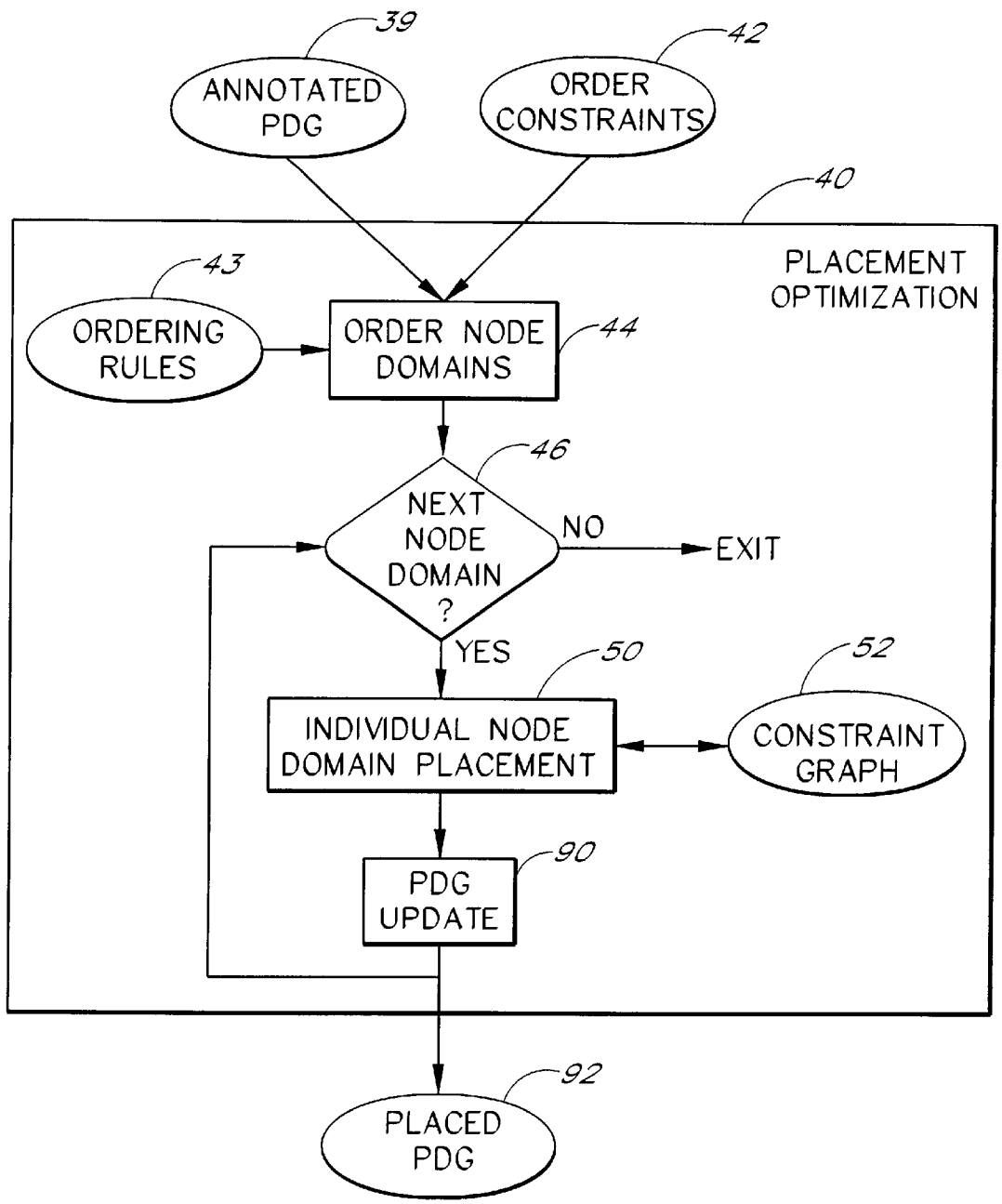
FIG. 4 is a flowchart illustrating the placement optimization step of optimizer system shown in FIG. 2.

FIG. 4 is a top-level flowchart illustrating the placement or mapping optimization step (40) in FIG. 2. This step (40) places or maps all of the node space polytopes in the PDG (39) (i.e., $P_{opnd}$ and $P_{def}$ as shown in FIG. 12) in a single common node space (92) by performing a series of combinatorial optimization problems. Each separate problem concerns itself with the placement (50) of a single node domain (46). The placement (50) is performed by a transformation (86) applied to the node domain. Therefore, although the word "placement" or "mapping" is used, the shape and/or characteristics of the node domain (46) may be changed by such a transformation (50).

Two sub-tasks are performed: node domain ordering (44) for individual placement and individual node domain placement (50). In one embodiment, node domain ordering is a statical method, because the placement ordering is determined once for all node domains and assumed to be fixed for all subsequent tasks in the placement optimization. Alternatively, placement ordering (44) may be a dynamic ordering.

The annotated PDG model (39) containing all of the exact node domain dependencies is used to determine the node domain ordering (44). At least two aspects of each node domain in the annotated PDG model (39) influence the ordering (44): the node domain arc affine mapping function and the node domain arc direction (see FIG. 12). Also, the ordering of a subset of node domains in the annotated PDG (39) may influence the ordering of the remaining domains. In one embodiment, the ordering of the node domains (44) is performed using a breadth first search. Additionally, user interaction (34) is possible by respecifying different ordering weights for each of the node domains (42).

The node domain arc affine mapping function in the annotated PDG (39) determines the dimensionality of the mapping $P_{ab}$ of a node domain $P_a$ on another node domain $P_b$. It therefore determines the dimension of the convex set formed by those grid points of $P_b$ with corresponding signal instances used by $P_a$. The maximum of the dimension of $P_a$ and its mapping $P_{ab}$ is a measure for the number of dependencies between $P_a$ and $P_b$. The dimensionality of the mapping $P_{ab}$ also influences the size of the set of optimal solutions. For example, if $P_a$ has a single dependency on a grid point of $P_b$ (a 0-dimensional mapping) then there may be many transformations with very different node domain placements, for which the length of this dependency vector will have the same Manhatten length.

If two node domains $P^1_a$, $P^2_a$ have a dependency on the same node domain $P_b$ then the one with the largest mapping $P^1_{ab}$, $P^2_{ab}$ will most likely have the most dependencies and thus the smallest search space of optimal transformations. This is a reason to transform this node domain first. Its placement will reduce the search space of optimal transformations for the other node domains. However, switching the transformation ordering for these node domains may lead to reducing the transformation space for the second node domain in such a way that all optimal transformations are lost.

The node domain arc direction in the annotated PDG (39) gives a rather natural ordering of node domains for the target domain of optimization problems, i.e., if $P_a$ depends on $P_b$ which depends on $P_c$, then $P_b$ should be placed somewhere between $P_a$ and $P_c$. The main reason for this is that in solving the problem of finding an optimal transformation only the dependencies between node domains which the transformation is known or which the transformation is part of the optimization problem can be accounted for. These node domains are the polytope to be transformed and the already placed node domains. Transforming the node domains in an order different from the dependencies or inverse dependencies leads to unpredictable dependency costs between these node domains.

Additionally, node domain ordering rules (43) can be employed to determine the node domain ordering (44) and the rules can be applied in various order. In one embodiment, leading to sequential placement of the node domains, each rule (43) selects, from a set of not yet transformed node domains in annotated PDG (39), a set of node domains which complies with the rule. Each rule selects its set of node domains from the set passed on by the previous rule. Note that rules involving arcs are bi-directional. These rules consider arcs as undirected edges between nodes. In this way, nodes other than sink or source nodes may be chosen as the first in the ordering. Alternate rule application procedures (e.g., nonsequential, heuristic application of the rule sets) may also be used for this step.

The sequential placement rule (43), as used in one embodiment, is explained in more detail herein. When sequential placement of node domains is applied (44), placing one node domain at a time leads to a stepwise growing cluster of node domains in the common node space (92). Given the characteristics of the node domains and dependencies, this leads to a stepwise increasing inaccessibility of node domains by encapsulation. In other words, when the 10th node domain to be placed has a dependency to the first placed node domain then the chances are high that these dependencies will be long and that its placement will be constrained by other node domains than the ones on which it depends. Therefore, from the set of node domains passed on by the above rules, those should be placed first which have dependencies on the lowest order placed node domains. The rest of the ordering for the remaining node domains is directly based on their inter-dependerncies. That is, if $P_a$ depends on $P_b$ then $P_b$ is given priority in placement with respect to $P_a$. If there are no dependencies between two node domains, the ordering is arbitrary. If there is a cycle then any one of all possible orderings may be best. In the preferred implementation one of all possible orderings is chosen, based on the study of practical examples. However, different orderings may be examined by providing a backtracking mechanism in which each ordering is evaluated in the common node space (47). Another approach is to split the node domains into non cyclic parts, which must be possible if the initial PDG (39) is derived from an executable specification. Splitting would, however, lead to a possibly large number of sub-node domains because the cyclic dependencies can be uniformly spread over the node domains.

In summary, the following steps may be applied for determining the node domain ordering step (44) using a static sequential rule:

Select the node domain in the graph (39) which has the largest number of dependencies with others (incoming and outgoing). This node domain forms the initial set of ordered polytopes Op.

Repeat until all node domains are ordered:

1. Select those node domains which are not in Op but which have dependencies to node domains in Op. These polytopes form set A.

2. Repeat until A is empty:
   (a) Remove those node domains from A which have a dependency with a node domain in Op with a maximum mapping-dimension for all node domains in A. These node domains form set B. The mapping-dimension of a dependency between a node domain $P_a$ and $P_b$ is the dimension of the node domain encapsulating all grid points of $P_b$ on which $P_a$ depends.
   (b) Repeat until B is empty:
      i. Remove those node domains from B which have a dependency with a node domain in Op with a minimal order for all node domains in B. These polytopes form set C. The order of a dependency is the order of the corresponding node domain in Op. If the corresponding arc in the graph is incident from the node domain to be placed then 1 is added to this order.
      ii. Give the node domains in C an initial order equal to their highest order dependency plus 1.
      iii. Order the node domains in C among themselves on their initial ordering and arc direction and add them to Op.

Note: Optional re-specification of the node domain ordering by the user is also possible (34,42).

Figure 5:
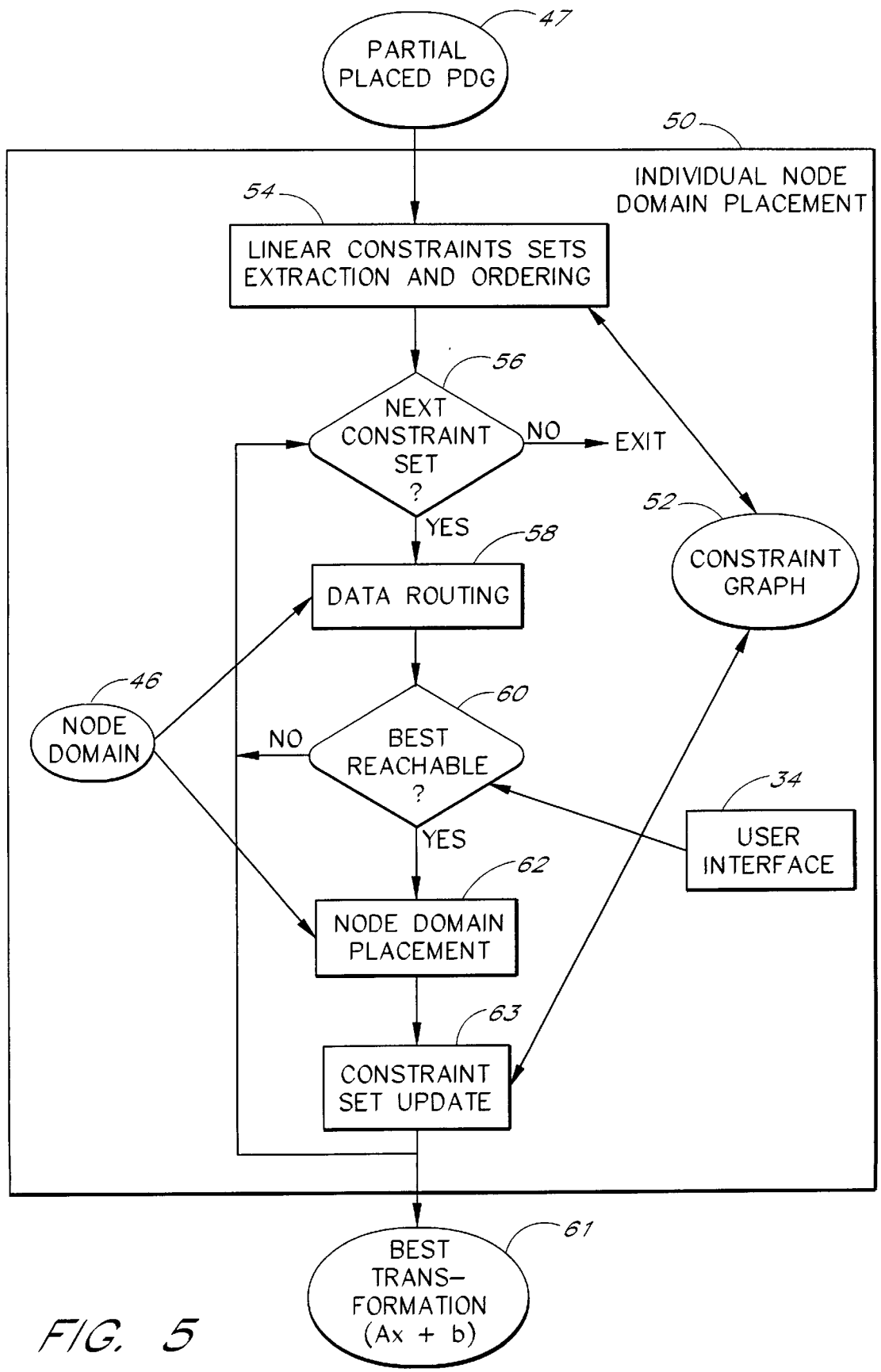
FIG. 5 is a flowchart illustrating the individual node domain placement step of the placement optimization step shown in FIG. 4.

FIG. 5 shows the flowchart of the individual node domain (46) placement step (50) is defined by the following optimization problem given constraint graph (52):

minimize:

$$\sum_{(x,y)\in D, x\in P} |w_{xy}| \|y - Ax - b\|_1 + \sum_{(x,y)\in D, y\in P} |w_{xy}| \|Ay + b - x\|_1$$

$$\rightarrow M$$

$$\rightarrow \alpha$$

variables: Transformation matrix A, offset vector b and ordering vector $\Pi$
constraints: A unimodular $$\alpha \in \{-1, 0, 1\}, b_i \in Z$$

$$\forall e \in E: \ C(Ae + b) \geq c$$

$$\forall (x, y) \in D, x \in P: \ \prod (y - Ax - b) \geq 0$$

$$\forall (x, y) \in D, y \in P: \ \prod (Ay + b - y) \geq 0$$

$$\forall d \in D_P: \ \prod Ad \geq 0$$

$$\forall d \in D_O: \ \prod d \geq 0$$

In the present embodiment, the minimization factors are given in the default order of applicability. Also, dependency length overrules dependency variance M which overrules maximal angle $\alpha$ between dependencies. The maximal angle $\alpha$ between dependencies is directly related to the search space of the ordering vector $\Pi$. $\Pi$ is optimized in the subsequent order optimization step (100) as discussed below.

The set D contains selected dependencies between the polytope P to be placed (46) and the placed polytopes (47), and the factors $w_{xy}$ define the weight associated with the dependencies. The extreme points of P (46) are $e \in E$, which after transformation must lie within the bounds set by the set of linear constraints defined by C and c.

Note that the ordering vector $\Pi$ is a variable but does not appear in the cost function. $\Pi$ is defined in the optimization problem to ensure the existence of a linear ordering vector. Determining an optimal ordering vector is not the objective of the placement optimization problem (50). $\Pi$ is calculated in step (100).

The sets $D_P$ and $D_O$ represent the rays of the cones that are convex hulls over the sets of dependencies within P (46) and within the collection of placed polytopes respectively (47). Only the rays have to be used since if an ordering vector exists for these dependencies then the same vector is valid for all dependencies in the cones. See, for example, G. L. Nemhauser, L. A. Wosley "Integer and Combinatorial Optimization", John Wiley & Sons, New York, N.Y., 1988.

The variables of the optimization problem (50) that determine the placement of a single node domain (46) are the coefficients of an affine transformation expressed by a matrix notation: y=Ax+b (86). Each node domain (46) has its individual affine transformation (86) which maps it from its original node space to the common node space (92). In principle, A is an n×m integer matrix and b a n×1 integer vector, with n the dimension of the common node space (92) and m the dimension of a certain node space (46). However, in one embodiment, all node domains (46) which are to be placed in a single common node space (92) have already been extended in dimension, to fit the common node space (92) dimension, as a pre-processing step when the PDG is extracted (32). Therefore, all transformation matrices A (86) are square (m=n).

Several cost functions are used in the placement optimization step (50). These functions are described below. More details can be found in Chapter 6 of van Swaaij, ibid, as appended hereto. A dependency angle is determined in a conventional manner (see Nemhauser, Ibid). A dependency variance is the number of distinct dependencies of a node (46). The computation of the number of dependencies and the dependency length is discussed here. If, for the transformation (86) of a single node domain $P_a$, (46) all dependencies (as defined in the annotated PDG (39)) with certain grid points in the common node space (92) should be taken into account then for each grid point of $P_{az}$, (46) with $P_z$, an already placed polytope in the partially placed PDG (47), the Manhatten length of the outgoing dependency should be determined. The complexity of this operation is, independent of the type of dependencies, at least as high as that of counting all grid points in a polytope ($P_{az}$) In order to make the optimization problem (50) computationally feasible, in one embodiment, only the dependencies on a selected set of grid points of $P_{az}$ are considered. Namely, the dependencies incident from the extreme points of $P_{az}$. Using only these dependencies in the cost function has the effect of minimizing the distance between $P_a$ (46) and $P_{az}$. According to the characteristics of the polytopes in the target domain of problems, the number of extreme points of $P_{az}$ is a measure for the dimension of the polytope and with that a measure for the number of grid points in the polytope. The same relation between dimension and polytope size were used in determining the order of transformation of node domains (44). Nevertheless, dependencies can be given a weight, which represents the actual number of dependencies between two node domains. To avoid counting grid points a different weighing measure is used. The weight of a dependency is equal to:

$$w = 2^{DM + n - rank(Af)}$$

with $D_M$ the dimension of the operation/operand space intersecting polytope belonging to the arc in the graph (39), n the dimension of the common node space (92) and rank(Af) the rank of the matrix Af of the original node space (46) to operand space mapping function associated with the arc. The reasoning behind this measure is that given the characteristics of the target problem domain, the actual number of single signal instance dependencies from a single node domain (46) for different arcs in the graph (39) relate approximately as h to the power of the dimension $D_{arc}$ of the polytope enclosing the operations that are involved in the dependency given by an arc. The constant differs from polytope to polytope. Because polytopes are placed one at a time, this constant may be set to a value larger than 1. The dimension $D_{arc}$ is given by the dimension of the operation/operand space intersecting polytope corrected possibly enlarged by a broadcast. The dimension of the broadcast is n−rank(Af).

The set of extreme points $P^E_{az}$ of the polytopes $P_{az}$ are constant in the optimization problem (50) because they are related to already placed polytopes (47). The set of corresponding grid points $P^E_{za}$ in $P_a$ is identical to the set of extreme points $P^E_a$ of $P_a$. If $p \in P^E_{az}$ corresponds to $x \in P^E_a$ then the redefined optimization function is:

minimize:

$$\sum_{x \in P^E_{az}} w \sum_i |(p-y)_i|$$

with y=Ax+b. If $d_i^k = (p^k - y^k)_i$ then this function can be written as:

minimize:

$$\sum_{k=1}^{\|P^E_a\|} w^k \sum_i \max(d_i^k, -d_i^k).$$

The $\max(d_i^k, -d_i^k)$ function replaces the absolute value function with, of course, the same result. The optimization function can be rewritten again by specifying $m_{ki} = \max(d_i^k, -d_i^k)$ which leads to $\Sigma_k \Sigma_i \cdot w_i^k m_{ki}$ The variable $m_{ki}$ can be expressed by linear inequalities of integer variables as follows:

$1 \leq i \leq n,$ $1 \leq k \leq \|P^E_a\|: \quad d_i^{k+} \geq (p^k - y^k)_i$ $\qquad d_i^{k+} \geq 0$ $\qquad d_i^{k-} \geq (-p^k - y^k)_i$ $\qquad d_i^{k-} \geq 0$ $\qquad m_i^k = d_i^{k+} + d_i^{k-}$ The linear expressions are linked to the constraints in the following way:

$1 \leq i \leq n,$ $1 \leq k \leq \|P^E_a\|: \quad y_i^k \quad = \sum_j (a_{ij} x_j^k) + b_i^k$ $\qquad \sum_j c_{ij} y_j^k \geq c_i$ Each individual node domain transformation has a constraint set. In one embodiment, a linear ordering constraint (54) is used within the placement optimization (50) to ensure the existence of executable code when completed. This is the linear ordering constraint, as known in systolic array design: $\exists \Pi, \forall d \in D: \Pi d \geq 0$, with $\Pi$ a row vector in the common node space (92) and D the set of all dependencies in that space.

In one embodiment, constraints are also redefined for both single node domain transformations (86) as well as the relations between node domain to transformations. All constraints are expressed in terms of linear constraints (54) in order to arrive at a description suitable to be solved by standard Integer Linear Programming (ILP) techniques.

Constraints are also imposed (54) on the transformation matrix (86). The characteristics of the node domains (46) and the optimal transformations (86) warrant the application of limited unimodular transformation matrices. First of all, the affine function f(x) is in practical cases bijective over $Z^n$ on the complete lattice, and not just over the node domains (46 in 39). This leads to the following advantages:

1. Each non redundant face and each extreme point of a node domain (46) are non redundant faces and extreme points after transformation (86).
2. The complexity of the constraints on f(x) is independent from any specific characteristics of the node domain (46) to be transformed.

These type of transformations are called lattice invariant. The grid points of a node space N are given by the set $\{x \in Z^n\}$, with n the dimension of the space. In general, the set $L(B) = \{y \in R^m: y = Bx, x \in Z^n\}$, where B is an m×n integer matrix, is called the lattice generated by the columns of B. The set of grid points of a node space is therefore the lattice generated by the columns of the identity matrix. If a transformation is given by an n×n integer matrix C, with $|\det C|$, then L(BC)=L(B), see Nemhauser, ibid. Matrices which comply with this constraint are called unimodular.

The transformation matrix used is in practical cases also restricted as follows. The limitation for each coefficient $a_{ij}$ is that $-1 \leq a_{ij} \leq 1$. The advantage of using this limitation is the restriction in the search space size.

The search space size is also constrained (54). Given the similar depending faces of two node domains (46), the placement (50) of a node domain (46) is constrained by only a single face per placed node domain (47). The combination of these constraining faces form a polyhedral in which the transformed node domain (46) must lie. The problem is now how to extract a set of valid polyhedral constraints (54) from the faces of the already placed node domains (47). This is achieved by the initial constraint set extraction (54) and the constraint set update (84) steps. A set of constraints is valid if the polyhedral defined by this set is non empty. Two constraints are said to exclude each other if they do not form a valid set. In extracting valid sets of constraints (54), the following observations are made:

1. A set of constraints is valid if the resulting solution space, intersects with the span of each constraint. The span of a constraint is the face from which it is derived, extended perpendicularly outwards from the node domain.
2. A constraint overrules another constraint if the corresponding face-inequality of the first holds for all elements of the face of the second.

All valid constraints (54) are derived from a constraint graph (52) $G_c = (V_c, E_c, E_{on})$. Constraint graph (52) is built stepwise as node domains (46) are placed in the common node space (47). Constraint graph (52) is a directed graph where each vertex represents a constraint given by a face of a node domain (46). Each vertex $v \in V_c$ is associated with:

1. A linear constraint $-e_i x \geq -b_i$ if the corresponding face is defined by $e_i x \geq b_i$.

2. A subset $P^E_i$ of the set $P^E$ containing all extreme points of the node domain (46), for which $P^E_i = \{y \in P^E: e_z y = b_i\}$ This set determines the span of the constraint.

There is an arc (v,w) ∈ $E_c$ from v to w if and only if w does not exclude or overrule v. Each arc is labeled with a boolean indicating whether the arc is on or off. The boolean is on if the polyhedral formed by the two constraints has an inner point (node domain is not empty), otherwise the boolean is off. If an arc a is labeled on then a ∈ $E_{on}$, which leads to $E_{on} \subset E_c$.

Using this specification of a constraint graph $G_c$ (52), a valid set of constraints is extracted (54). A set V ⊂ $V_c$ constitutes a valid polyhedral constraint if and only if:

1. $V_v$, w∈V, v≠w: $\{(v,w,), (w,v)\} \subset E_{on}$
2. There is no clique Q such that V ⊂ Q.

The first item indicates that a valid polyhedral constraint consists of a subset of vertices of $V_c$ where each vertex has an arc to each vertex. Furthermore, each arc must be on. A valid polyhedral constraint can also be described as a clique in the graph $G'_c = (V, E_{on}, 0)$. The second item says that the set of vertices representing the polyhedral constraint cannot be part of a larger clique in $G_c$.

Each polyhedral constraint is represented by a constraint matrix C and constraint vector c. If the set of extreme points of a node domain to be transformed $P_a$ (46) are $P^E_a$ then the constraints can be specified as: $x \in P^E_a$: Cx ≧ c.

The actual solution of the optimization problem (50) formulated above for a single node domain (46) is now partitioned into solving two sub-problems:

1. Solving the coefficients (A and b in the transformation (86) Ax+b) by a branch-and-bound technique (72). An efficient technique to solve the placement optimization (50) problem makes use of the structure of the problem in its solution space search and will efficiently implement the constraint resolution and optimization function evaluation.

The unimodularity constraint can not so easily or efficiently be implemented by linear constraints on integer variables. A general Integer Linear Programming (ILP) formulation is therefore not attractive. A branch-and-bound method (72) is more appropriate because the following essential branch-and-bound features are present in the problem:
(a) A structured division of the search space.
(b) An accurate and fast lower-bound calculation on the minimal reachable cost.
(c) A dominance test between individual partial solutions.

See generally P. H. Winston, "Artificial Intelligence", Addison-Wesley, Reading, 1984.

Each single coefficient of a dependency vector adds to the overall cost of a solution. These coefficients correspond to the projection of a dependency on the orthonormal base vectors of the common node space (92). A natural division of the search space is therefore by base vector. Lower-bound calculations and dominance test are essential in making branch-and-bound more efficient than a simple enumeration of the search space. The lower-bound cost estimates cut out partial solutions whose costs increased by the lower-bound estimates on the remainder of the solution is higher than the to best solution found so far. The dominance relation test cuts out redundant paths in the search tree. See generally P. H. Winston, "Artificial Intelligence", Addison-Wesley, Reading, 1984.

2. Solving the b coefficients by an ILP formulation.

minimize: $\sum_k \sum_i |w_k|(d^+_{ki} + d^-_{ki})$ variables: $d^+_{ki}, d^-_{ki} \in R^+$ $b^+_i, b^+_i \in Z^+$ constraints $\forall e \in E: C(A_e + b) \geq c$ $\forall (x^k, y^k) \in D, \forall 1 \leq i \leq n:: \quad d^-_{ki} \geq -y^k_i + A_i x^k + b_i \quad \text{if } x^k \in P$ $d^+_{ki} \geq y^k_i - A_i x^k - b_i \quad \text{if } x^k \in P$ $d^-_{ki} \geq x^k_i - A_i y^k - b_i \quad \text{if } y^k \in P$ $d^+_{ki} \geq -x^k_i + A_i y^k - b_i \quad \text{if } y^k \in P$ The absolute value function on the dependency lengths of the optimization problem (50) is expressed in linear programming terms by splitting each coefficient of each dependency vector $d_{ki}$ into a positive $d_i^{k+}$ and negative $d_i^{k-}$ variable, whose values are always positive and whose sum gives the absolute value of their corresponding coefficient.

The set E represents the set of extreme points of the polytope to be transformed (46). The matrix A is given as a result of the branch-and-bound algorithm (72). The set D represents those dependencies that are selected by the data routing estimation procedure (58).

The resulting integer programming problem can be solved with a general ILP solver. The solution space search of the ILP-solver can be sped up substantially by providing a upper bound on the optimal cost. The cost of the initial guess as well as the costs of the best transformations so far are used for this.

The general formulation and the principle solution approach are discussed above. Now, the different steps in the flowchart of FIG. 5 are explained in detail.

The linear constraint sets extraction and ordering step (54) has input of a constraint graph of the common node space (52) and the set of extreme points mapped by the appropriate affine dependence functions to the already placed node domains in the common node space (47). This step (54) selects all valid polyhedral constraints by finding all maximal cliques. Finding the maximal clique is a problem that can be solved by standard algorithms that are generally available. Also a list of graph nodes is kept that are not involved in any correct constraint set. This list of nodes is excluded from future clique searches to increase the efficiency of the clique search. A collection of polyhedral constraints is output.

Next, each of these constraint sets is considered one at a time in the order derived above (56). First, the data routing step (58) is performed for the given constraint set (56). The communication scheme between node domains (46) in the node space is described in the annotated PDG (39). This communication scheme can often be changed without changing the overall behavior of the code represented. Exploiting the broadcast of signal instances is one way of changing the communication scheme. If an operation needs a certain signals instance as operand then it may obtain this instance directly from the operation that generated it. This is represented by a dependency between the consuming and producing operations. These dependencies are represented in the annotated PDG (39). However, the same signal instance may be obtained from another operation that uses the same instance as operand. The idea is that an operand is passed on from operation to operation. This technique is explicitly used in "localization" for array synthesis. The localization technique is aimed at dependencies within node domains (46) and not between polytopes. Selection of a certain localization at node domain level is done as follows:

1. select for a node domain (46) only those dependencies from or to other node domains (46), which are already placed in a common node space (47).
2. select for the given constraint set (56) that node domain interconnection scheme for the selected dependencies for which the operand source points are closest to the constraining hyperplanes.

The data routing step involves several calculations such as mapping the extremes (starting and ending points) of the polytopes in PDG (39); finding the minimal extreme dependencies; selecting an ordered collection of ending points; and computing an absolute lower bound dependency cost.

Thus, the extremes are mapped for each arc in the PDG (39) from the node domain to be placed (46) to an already placed node domain in (47) by:

1. Selecting the extreme points of the intersection of operand space and operation space node domains (see FIG. 12) belonging to the given arc.
2. Mapping the extreme points back to the node space node domain of the node domain to be placed (46). Mapping the extremes points back to the already placed node domain (47).

From this, dependency starting points and dependency ending points (points belonging to set of placed node domains(47)) are output. PDG arcs in (39) indicating, per dependency, from which arc it is derived is also output. Arc-information is used later to determine the direction of the dependency and the number of signal instances involved with it.

The minimal extreme dependencies are then derived. Input is a set of dependency starting points belonging to the node domain to be placed (46), a set of dependency ending points belonging to a placed node domain (47), unplaced polytopes (39), and placed polytopes (47). A set of dependency ending points, which extends the given set by other possible ending points belonging to operations that use the same signal instance as an operand is derived by checking for each operand space, corresponding to a placed node domain (47), if the same signal instance(s) is (are) used. Each such operand space point is mapped back to the placed node domain in the common node space (47). This point is also added to the set of ending points.

Next, an ordered collection of ending points is derived from a set of dependencies, a set of constraints, and an ordered collection of sets of dependency ending points. Select for each set of ending points that point p that has the minimal positive distance to one of the constraining hyperplanes. If a constraint is specified as, $Cx \geq c$, then the distance is expressed as $c-Cp$. If the original ending point has minimal distance then this point is preferred over others with the same minimal distance.

Finally an absolute tight lower bound computation is made to reduce the search space. The input is: dependency starting points, dependency ending points, dependency weight sets, and the given constraint set (56). For each set a weighted total distance figure is calculated as $dist^k = \hat{A}_{pk} w^k (1+c-Cp^k)$, with $w^k$ the weight associated with the dependency. Only those distances are summed which are positive. The points p belong to the ending-point set for a specific constraint set. For each set of start and ending points a figure is calculated indicating the expected lowerbound cost related to shape-mismatch between start point and end points. For each point startpoint $q^k$ and corresponding end point $p^k$ the mismatch is calculated as $mism^k = w^k |min_i(p^k_i - p^o_i) - min_i(q^k_i - q^o_i)|$. In this equation $p^o$ is a reference start point from the set and $q^o$ the corresponding reference end point. The maximum of $dist^k$ and $mism^k$ is the expected lowerbound dependency cost for the given constraint set with starting and ending points.

It is then determined if this is the best reachable solution (60). Given the starting and ending dependency points with weights and a current minimum dependency length cost, a boolean indicating if the minimum is reachable is output. The row of the transformation matrix A at which minimum is exceeded is also output. For each pair of starting and ending points $q^k$ and $p^k$ the sum: $\Sigma_i w^k (1 + |q^o_i - q^k_{i} - p^o_i + p^k_i|)$ is calculated. This sum is row-wise, starting at the top row, calculated. As soon as the intermediate result exceeds the given minimum then false is returned with row=i. Thus, it is not needed to continue with this constraint set and the next constraint set is retrieved (56). This pruning step is very effective because otherwise, actual placement of the node domain would be performed which is very time consuming.

Figure 6:
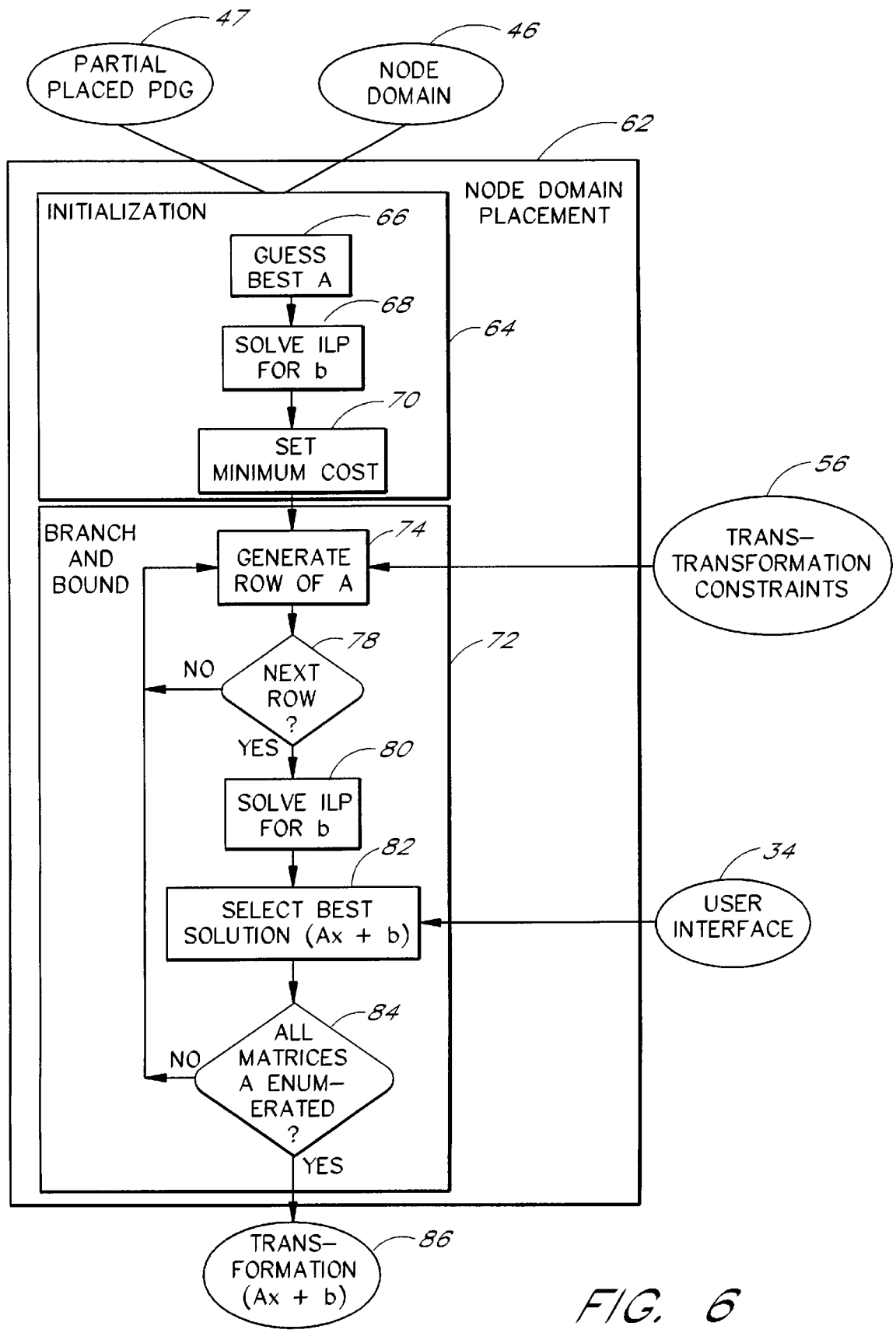
FIG. 6 is a flowchart illustrating the node domain placement step of the individual node domain placement step shown in FIG. 5.

Referring to the flowchart of FIG. 6, the actual placement (62) of a node domain (46) is performed by using an initialization step (64) and a branch and bound step (72). The branch-and-bound method needs an initial cost to start with. The initial (best so far) transformation matrix is the identity matrix (66). Solving the problem of finding the translation vector with minimum dependency length cost (68) will establish the best minimum dependency length cost and best maximum total cone angle so far. A constraint set (56), starting points and ending points, and a weight set (58) are used to derive the minimum dependency length cost so far with corresponding best transformation (70).

Using a branch-and-bound technique (72) the search space of transformation matrices is enumerated in a row by column fashion (74). In the preferred embodiment, matrix coefficients are limited to $\{-1, 0, 1\}$. Enumeration can be represented by a tree, in which each node represents a chosen value of a coefficient and from which branches out in as many different parts as their are choices of for the next coefficient (3 in this case). Enumeration is limited to small sections of the search space by cutting of branches of the enumeration tree as close as possible to the initial node. The goal is to minimize the number of times to solve an ILP-problem (80) while retaining the optimal solution. Two different types of nodes can be distinguished in the enumeration tree. The first type branches to a coefficient in the same matrix row. The second type ends a row and branches to a coefficient of a next row (78). Branch cutting will be done at the second type of node.

The cost function of the placement optimization (82) contains three optimization components: minimum dependency length, dependency variancy and minimum dependency angle (or search space). Given the current transformation with its dependency length, dependency variancy and dependency angle and the best transformation thus far with its dependency length, dependency variancy and dependency angle, the best transformation $Ax+b$ is selected (82). Of all transformations for all constraint sets as derived by implicit enumeration, that one is chosen as best which minimizes the maximum total cone angle, or has an maximum total cone angle at least as small as any other transformation and the smallest total dependency length cost. User interaction (34) is also possible by overruling the above described default costs, by respecifying the weight of the three cost parameters.

In each step of the branch and bound step (72), the transformation matrix A so far (84), the minimum dependency length cost so far (70), the row and column indicating the coefficient to be modified (74, 78), the constraint set (56), starting and ending points, weight set, (as calculated above) and the best transformation so far (82) serve as input to the ILP solver. The output is a row at which dependency length cost is exceeded (74) (if this row=n then cost has not been exceeded) and a new minimum dependency length cost so far with corresponding best transformation (82). Thus, the branch and bound step (72) is procedurally defined by:

if all coefficients are set (row=n) then:
  If matrix A is unimodular and current minimum dependency cost is in reach then:
    Solve the ILP-problem of finding the translation vector b with minimum weighted dependency length cost (call to a general ILP solver) (80).
  If resulting cost is lower than current minimum then:
    Set new minimum cost, retain this transformation as best so far (82).
    Else, determine at which row, starting from the top, the minimum cost is exceeded. Return this row number.
  Else, return with row=row of matrix at which cost is exceeded, starting from the top row.
Else:
  1. Set coefficient A(row, column) to −1. Recursively call this function for next coefficient. If returned row is lower then this row then return that row, otherwise:
  2. Set Coefficient A (row, column) to 0. If present row is not a null row then recursively call this function for next coefficient (only checked when column=n). If returned row is lower then this row then return that row, otherwise:
  3. Set coefficient to 1. Recursively call this function for next coefficient. Return the returned row.

Referring back to FIG. 5, after a node (46) is placed (62) the constraint set (52) is updated (63). A collection of constraint sets with starting and ending points, weight sets and the dependency cone of the total of the placed node domains (52) is input. A re-ordered collection of constraint sets is output (63, 52). First calculate for each constraint set (52) the expected resulting maximum angle in the total dependency cone after placement of the node domain (62). Each hyperplane vector of a set of constraints is added positively to the existing dependency cone if there exists a dependency indicating data flow from the placed node domains (47) to the polytope to be placed (46). Otherwise, these vectors are added negatively. If both type of dependencies exist, only the positive additions are made. For the resulting cone the maximum cone angle between any two dependencies in the cone is calculated. Two sets of constraints $S_a$ and $S_b$, with order($S_a$)<order($S_b$), in the given ordering exchange their ordering position if either:

1. The expected lowerbound dependency cost $S_a$ is higher than that of $S_b$, or:
2. The expected lowerbound dependency costs are equal, but the expected maximum cone angle for $S_a$ is larger than that of $S_b$, or:
3. Both expected lowerbound dependency costs and expected maximum cone angles are equal, but the node domain to be placed is already complying to $S_b$.

Summarizing, the placement or mapping step (40) is the following:

1. Order node domains for placement (44).
2. Select next node domain in ordered set (46).
3. Extract constraint sets (54).
4. (a) Select next best constraint set (56).
  (b) Select for this constraint set (56), the 'best' inter-node domain communication (58).
  (c) Calculate for the constraint set the expected lowerbound dependency cost and the maximum dependency cone angle (60). If the expected lowerbound dependency cost and the weighted ending point to constraining hyperplane dependency costs are lower or equal to the current minimum dependency cost, and the expected maximum dependency cone angle is lower or equal to the present best maximum cone angle then continue ("yes") to step 4(d) (62), else go to step 4a (56) ("no").
  (d) Heuristically select an initial transformation matrix (66) and solve the ILP problem for the translation vector (68). This transformation sets a minimum dependency length cost and maximum cone angle (70).
  (e) Implicitly enumerate over transformation matrix search space, using current minimum dependency length cost as bound to reduce the search space (72) until all transformations have been tried out (84). Keep that transformation which has the smallest maximum dependency cone angle or a lower dependency length and a maximum cone angle at least as small as that of others (86).
  (f) Update the constraint set descriptions (63) and continue at step 4a (56) until all constraint sets are processed and until a best transformation matrix Ax+b has been found (61).
5. Continue at step 2 until all node domains are placed (46).

Figure 7:
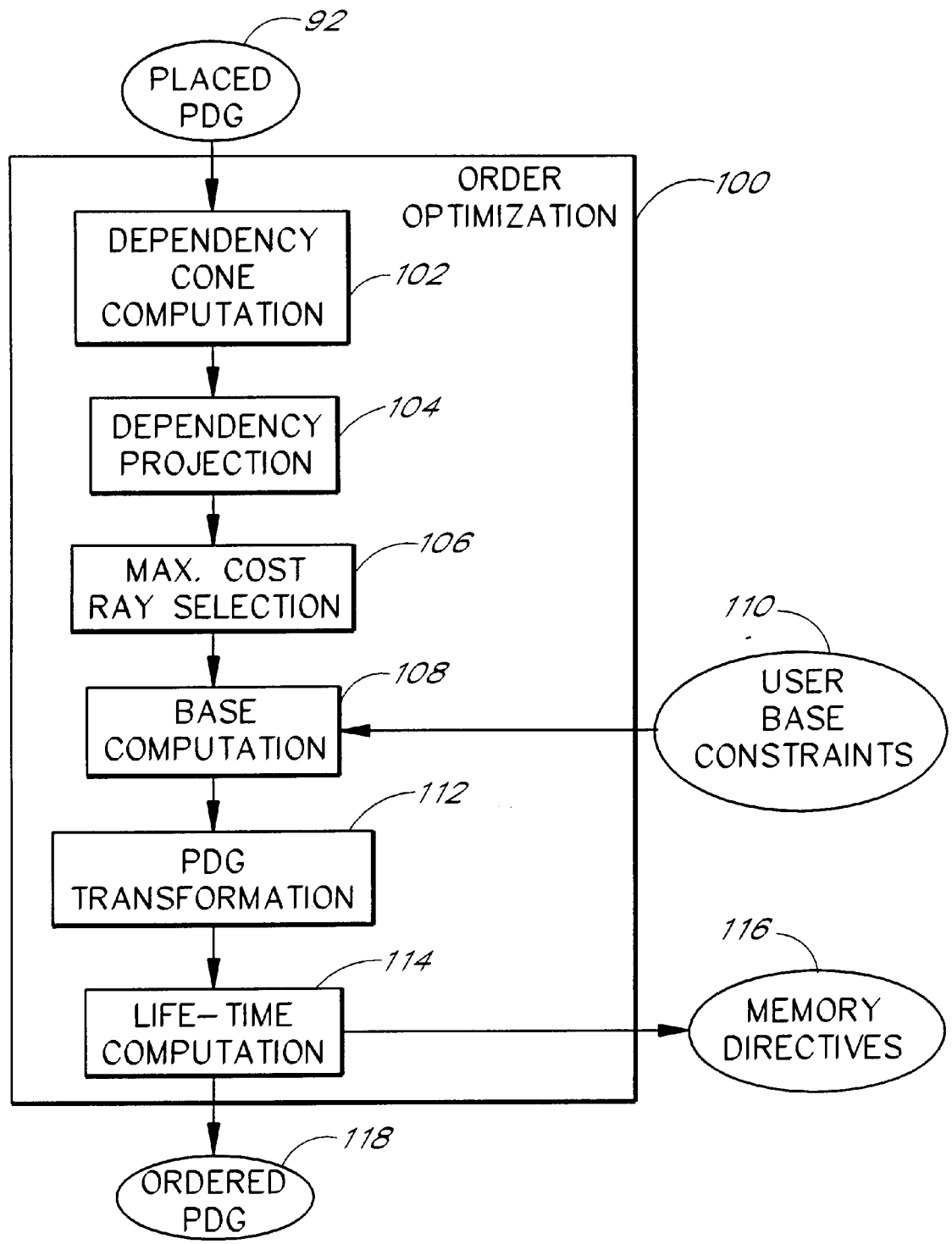
FIG. 7 is a flowchart illustrating the order optimization step of the placement optimization step shown in FIG. 4.

Referring to FIG. 7, the order of the placed PDG (92) is optimized (100). An ordering vector Π maps a n-dimensional space (92) to a 1-dimensional ordering axis. This mapping or transformation (112) is based on the fact that the operations in the placed PDG (92) are represented by the lattice elements of bounded polyhedra. Because of this, Π can be decomposed into an ordered set of linearly independent row vectors $\{A_1, A_n\}$ such that for each pair of points x, y from the common node space of the PDG (92) the following relation holds: if $A_i x < A_i y$ then Πx<Πy. Furthermore, if $x-y=\lambda A_i$ and $x-z=\mu A_j$ with i>j then Πx<Πz. In other words, operations are first ordered along the direction of $A_n$ followed by $A_{n-1}$ etc. In terms of procedural code, the direction of $A_n$ corresponds to the most inner loop of a body, while that of $A_1$ corresponds to the most outer loop. The ordering vector Π can, therefore, be calculated by defining the order of directions in which the operations are best executed.

The goal of order optimization problem (100) is to find an ordering vector Π that corresponds with a minimal signal storage requirement when executing the transformed specification description (150). The key idea is that whenever all dependencies have the same direction, then ordering the execution of operations in this direction minimizes the storage requirements. Therefore the problem is to find new base vectors (108) which correspond to an ordering that follows these maximum dependency directions.

Thus, a dependency cone computation is made (102). This is a collection of all intra- and inter-dependency vectors of the placed PDG (92). All dependencies in the placed PDG (92) are projected (194) on the dependency cone rays (102). All dependency costs are accumulated to calculate a projection cost (104). For each dependency cone ray r∈C, calculate:

$$R(r) = \sum_{d \in D} \frac{|r^T d|}{\|r\|}$$

A dependency cost for each dependency cone ray is calculated and the maximum cost is derived (106). Rays are selected that are linearly independent by selecting the ray with the highest R(r) and adding linearly independent rays in order of highest R(r). The number of selected rays m is smaller or equal to n, the dimension of the common node space (92) in which the dependencies are defined. The m selected rays $r_i$; form the rows of the selected ray base X:

$$X_i = \frac{r^T i}{\|r\|} \text{ of the matrix } X, \text{ with } R(X_i^T) \geq R(X_j^T) \text{ if } i > j.$$

The base computation (108) computes the closest unimodular base transformation. The selected ray base (106), all dependencies from the placed PDG (92), and possibly user-defined constraints (110) are input and a unimodular base transformation is output (108). The problem is solved by a general ILP solver. The problem is formulated by the following optimization problem:

$$\text{minimize:} \quad \sum_i \sum_j R(X_i^T)|Aij - Xij|$$

variables: $n \times n$ matrix $A$ constraints: $A$ unimodular $$\forall d \in D, 1 \leq i \leq n: \ (A^{-1}d)_i \geq 0$$

The ordering vector $\Pi$ is calculated as:

$$\prod = \sum_{i=1}^{n} \left( A_i \prod_{k=1}^{i} m_k \right)$$

$$mk = \begin{cases} 1 & (k=1) \\ \text{maximum } \forall x,y \in PDG(A_k(x-y)) & (k > 1) \end{cases}$$

The base vectors of A are derived from the rays of the cone of the dependencies, since the ordering vector must have a positive component along each dependency vector. The sum of the inner products of the dependencies on a ray gives a measure for the length and number of those dependencies that have a component in the direction of that ray. The base vectors are formed by linearly independent rays with the highest inner product sums. These base vectors may not set up the complete dimensional space, or may not form a unimodular matrix. Unimodularity is used here to preserve placed PDG (92) characteristics after transformation (112) of the PDG by A. The formulation of creating a unimodular A describes that the larger the weight for a base vector, the more important it is for the corresponding row of A to equal it.

The unimodular base transformation matrix A (calculated in 108) is used to transform (112) all node domains of the placed PDG (92) to an ordered PDG (118), in which each dimension can be directly interpreted as a nested loop in a procedural code. $\Pi$ is found as indicated above.

Additionally, signal life times per signal, window per signal (size) and the maximal number of signals are calculated (114) for all signals in the ordered PDG (118). These characteristics of the ordered PDG (1 18) are used as memory directives (116) when compiling (164) the optimized code (150) into computer code for further compilation (166) into the target machine code (168). Basically, at all the extreme points of the ordered node domains located in a common node domain (118), the number of integer points within polytopes, that represent the difference of produced and consumed signals, are counted. An efficient algorithm based on Fourier-Motzkin elimination is used, see, for example, F. Balasa, F. Catthoor, H. De Man, "Optimal Evaluation of Memory Area for Multi-dimensional Processing Systems", accepted for *IEEE Int. Conf. Comp. Aided Design*, Santa Clara Calif., November 1993. The maximal number of signals over the complete time interval is also computed.

Figure 8:
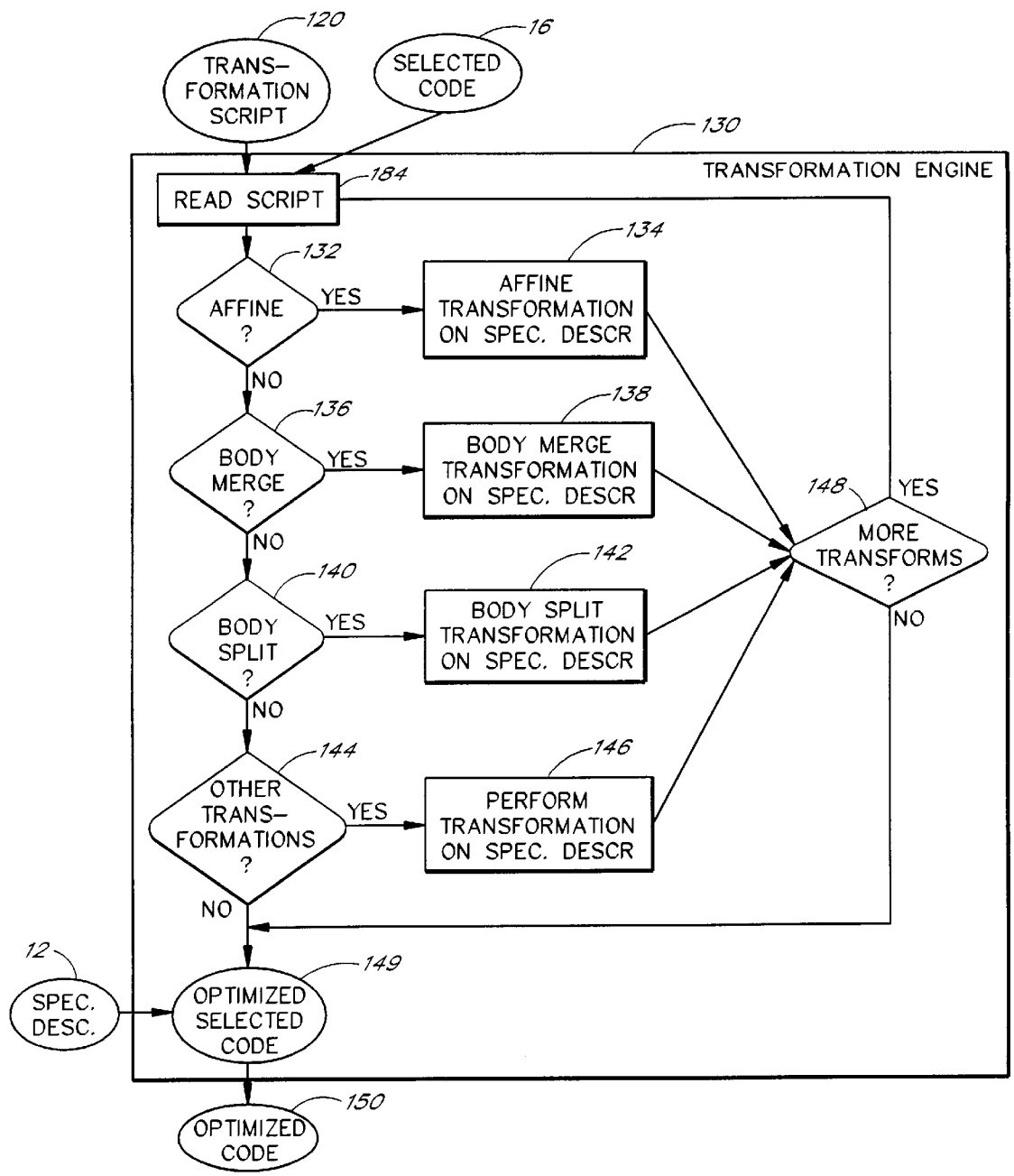
FIG. 8 is a flowchart illustrating the transformation engine step of the optimizer shown in FIG. 1.

Referring to FIG. 8, the transformation script (120) consists of transformations such as affine transformations (132), N-dim-body merge transformations (140), and total-body-split transformations (140) among other transformations (144). These transformations (described below) are applied to the selected code (16) in the transformation engine (130) according to transformation script (120) to produce optimized selected code (149). Optimized selected code (149) is then combined with the original code (12) to produce optimized code (150). Transformations are read (184) and applied to the selected code (16) until no more transformations exist (148) in the transformation script (120).

The affine transformation (134) performs a unimodular affine transformation on the selected code (16). For example, given the initial Silage code:

(i: $n_{s1}$ ... $n_{e1}$)::

(j: $-v_{s21}i + n_{s2}$ ... $-v_{e21}i + n_{e2}$)::

$S[A_S x + b_S] = \text{if } (Cx \geq c) \rightarrow T[A_T x + b_T]fi;$ with $x=(ij)^T$ and $A_s x + b_s$, $A_T x + b_T$ affine 2 dimensional index expressions. The correct Silage description of signal S is:

$S[A_{S_{11}}i + A_{S_{12}}j + b_{s_1}][A_{S_{21}}i + A_{S_{22}}j + b_{s_2}]=$

The factors $n_{sk}$, $v_{skl}$, $n_{ck}$, $V_{ckl}$ are constants. Notice that the loop bounds can be described by two sets of inequalities: $V_s x \geq n_s$, $V_c x \leq n_c$ with, for example, $V_s x \geq A_s$ as:

$$\begin{bmatrix} v_{s21} & 1 & & \\ . & . & \cdots & \\ v_{sn1} & \cdots & v_{snn-1} & 1 \end{bmatrix}$$

The condition is expressed as $Cx \geq c$ with C a m×n matrix, with m the number of conjunctive inequalities. The correct Silage syntax (for n=2) is:

if $(C_{11}i + C_{12}j \geq c_1 \& \ldots \& C_{n1}i + C_{n2j} \geq c_m)$

The affine unimodular transformation $y=Ax+b$ is applied to the initial description ($y=(i'j')^T$ and $\det(A)=\pm 1$):

$A_S x + b_S \xrightarrow{Ax+b} A_S A^{-1} y - A_S A^{-1} b + b_S = A'_S y + b'_S$ $A_T x + b_S \xrightarrow{Ax+b} A_T A^{-1} y - A_T A^{-1} b + b_T = A'_T y + b'_T$ -continued $$Cx \geq c \xrightarrow{Ax+b} CA^{-1}y \geq c + CA^{-1}b = C'y \geq c'$$

$$V_s x \geq n_s \xrightarrow{Ax+b} V_s A^{-1} y \geq n_s + V_e A^{-1} b = V'_s y \geq n'_s$$

$$V_e x \leq n_e \xrightarrow{Ax+b} V_e A^{-1} y \leq n_e + V_e A^{-1} b = V'_e y \leq n'_e$$

Note that the transformed index expressions can directly substitute the original ones. Less obvious is the derivation of the resulting syntax for the loop bounds. Loop boundary matrices have a special format, as shown in the first section. The resulting matrices $V'_s$ and $V'_e$ do not necessarily have this format (if they do, they can directly substitute the original expressions in the loop boundaries). Furthermore, there's the problem of optimizing the set of conditions (redundant condition removal, etc.).

(i': min(i') ... max(i'))::

(j': min(j') ... max(j'))::

$S[A'_s x + b'_s] =$ if $(C'y \geq c'$ & $V'_s y \geq n'_s$ & $V'_e y \geq n'_e) \to T[A'_T x + b'_T] fi$;

The min and max functions return the minimum and maximum value that an iterator takes within the given conditions.

The unimodularity of the transformation matrix ensures that each set of integer values for (i'j') that lies within the transformed set of conditions has one and only one equivalent point (ij) in the original construction. If the loop structure is unrolled, and the index expressions evaluated, the resulting set of assignments is identical to that which is found by unrolling the original Silage code construction. Although the index expressions have changed, the actual indexing remains unaltered.

An example of a loop interchange transformation is given:

(i6 : 0 .. 10)::

begin (i7 : i6 + 1 .. 239)::

A[i6][i7] = A[i6][i7 − 1]

end;

The description can be represented by the following matrixes $$AS = \begin{bmatrix} 1 & 0 \\ 0 & 1 \end{bmatrix} \quad b_S = \begin{bmatrix} 0 \\ 0 \end{bmatrix} \quad A_r = \begin{bmatrix} 1 & 0 \\ 0 & 1 \end{bmatrix} \quad b_T = \begin{bmatrix} 0 \\ -1 \end{bmatrix}$$

$$V_S = \begin{bmatrix} 1 & 0 \\ -1 & 1 \end{bmatrix} \quad n_S = \begin{bmatrix} 0 \\ 1 \end{bmatrix} \quad V_E = \begin{bmatrix} 1 & 0 \\ 0 & 1 \end{bmatrix} \quad n_E = \begin{bmatrix} 10 \\ 239 \end{bmatrix}$$

In this example the condition matrix does not exist. When we apply a loop interchange transformation the following transformation matrix is used:

$$A = \begin{bmatrix} 0 & 1 \\ 1 & 0 \end{bmatrix} \quad b = \begin{bmatrix} 0 \\ 0 \end{bmatrix}$$

After doing the matrix multiplications:

$$AS = \begin{bmatrix} 0 & 1 \\ 1 & 0 \end{bmatrix} \quad b_S = \begin{bmatrix} 0 \\ 0 \end{bmatrix} \quad A_r = \begin{bmatrix} 0 & 1 \\ 1 & 0 \end{bmatrix} \quad b_T = \begin{bmatrix} 0 \\ -1 \end{bmatrix}$$

$$V_S = \begin{bmatrix} 0 & 1 \\ 1 & -1 \end{bmatrix} \quad n_S = \begin{bmatrix} 0 \\ 1 \end{bmatrix} \quad V_E = \begin{bmatrix} 0 & 1 \\ 1 & 0 \end{bmatrix} \quad n_E = \begin{bmatrix} 10 \\ 239 \end{bmatrix}$$

$V_E$ and $V_S$ have to be rewritten in diagonal form. The resulting Silage description is derived:

(i6 : 1 .. 239)::

begin (i7 : 0 .. MIN(10, i6 − 1))::

A[i7][i6] = A[i7][i6 − 1]

end;

In a total-body-split transformation, all statements in the body of a loop are split. A body with N statements will result in N loops with one statement. This is done for all loops in the description.

eg. (i6 : 0 .. 10)::

begin

A[i6][i6] = H[0] ∗ H[i6]

(i7 : i6 + 1 .. 239)::

A[i6][i7] = A[i6][i7 − 1] + H[i7 − i6] ∗ H[i7]

(i5 : 0 .. 0)::

B[i5][i6] = A[i6][239]

end;

total-body-split will result in:

(i6 : 0 .. 10)::

A[i6][i6] = H[0] ∗ H[i6]

(i6 : 0 .. 10)::

(i7 : i6 + 1 .. 239)::

A[i6][i7] = A[i6][i7 − 1] + H[i7 − i6] ∗ H[i7]

(i6 : 0 .. 10)::

(i5 : 0 .. 0)::

B[i5][i6] = A[i6][239]

An N-dim-body-merge transformation takes together two loops in one new loop. The two loops are allowed to be more dimensional (nested) loops. The bodies of the two original loops are taken together as one new body. Conditions are added to the original bodies such that it is executed only for original values. In case of merging two N dimensional loops the result will be one N dimensional loop containing the two bodies. Special care has to be taken to adjust the index names in the loop bodies.

```
eg.  (i6 : 0 .. 10)::

(i1 : 0 .. 30)::

A[i1][i6] = H[0] * H[i6]

(i3 : 0 .. 10)::

(i7 : i3 + 1 .. 239)::

A[i3][i7] = A[i3][i7 – 1] + H[i7 – i3] * H[i7]

(i6 : 0 .. 4)::

(i5 : 0 .. 0)::

B[i5][i6] = A[i6][239]

after Ndim_body-merge (i6 : 0 .. 10)::

(i1 : 0 .. 239)::

begin

A[i1][i6] = if (30 = i1) – H[0] * H[i6]

A[i6][i1] = if (i1 = i6 + 1) – A[i6][i1 – 1] + H[i1 – i6] * H[i1]

B[i1][i6] = if ((i1 == 0) (4 = i6)) – A[i6][239]

end;

end;
```

Referring to the flowchart of FIG. 10, in one instantiation of the invention, the transformation engine (130) is embodied in a program called SynGuide which is run in batch mode (180) as it reads (184) the transformation script (120) and applies the transformations (132–148) to the description specification (16). The process shown in FIG. 10 can also be used in selecting (14) the code to be optimized (16), and for editing (196) the original specification description (12) in the specification environment (10). Actions are performed until no more actions are specified (200) by either the script (184) or the user (34), and the system exited (400).

Figure 11:
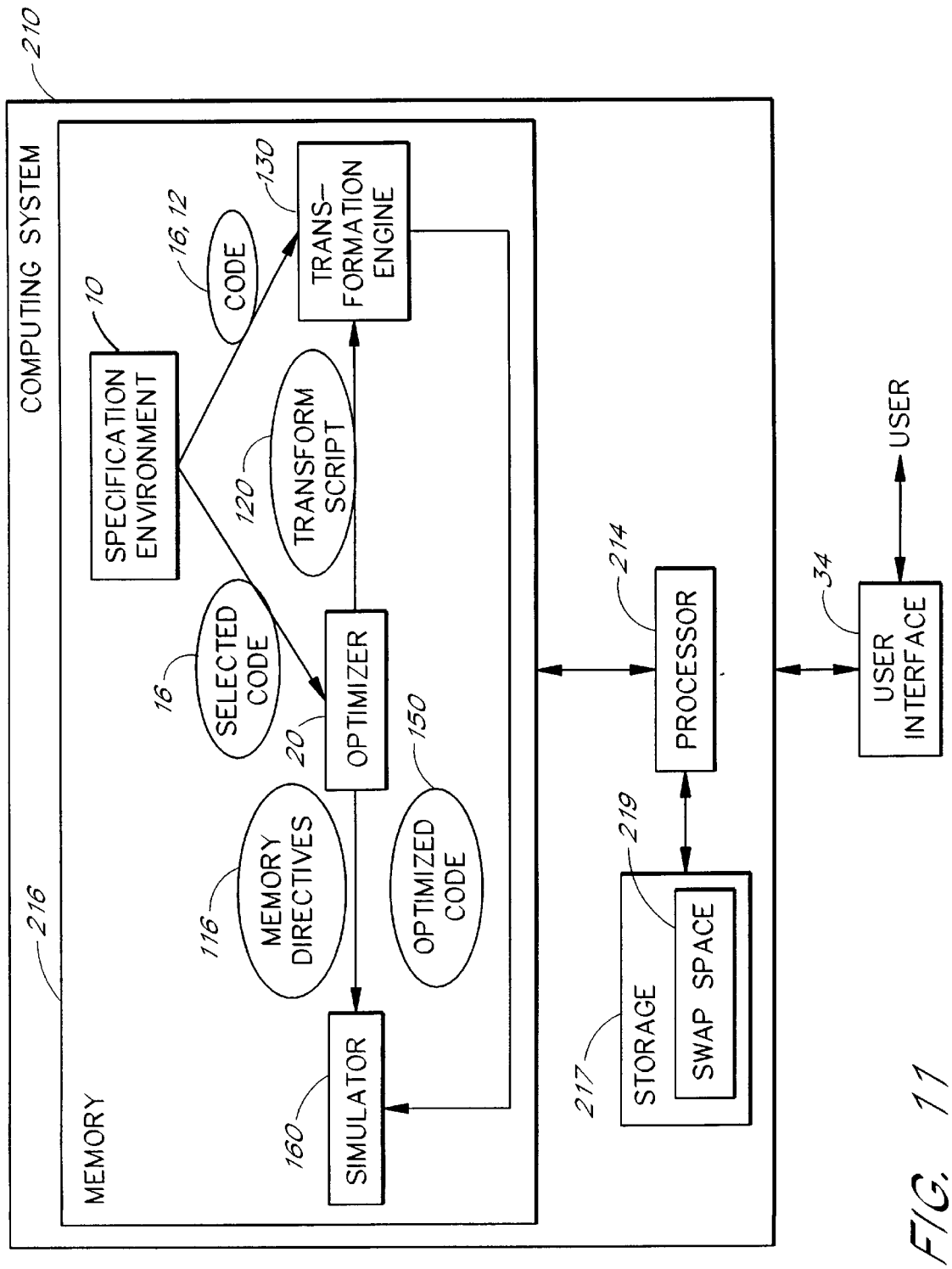
FIG. 11 is a flowchart illustrating one embodiment of an apparatus embodying the present optimizer invention shown in FIG. 1.

FIG. 11 illustrates one embodiment of an apparatus embodying the present optimizer invention shown in FIG. 1. Computing system (210) may variously contain a processor (214), memory (216), storage (217) unit, and user interface (34). Computing system (210) may be any conventional computer system, personal computer, or workstation. Processor (214) can be any conventional central processing unit (CPU), and may be connected to other processors in serial or parallel or via a conventional network. Processor (214) operates according to a conventional operating system of the computing system (214). Processor (214) is variously coupled to memory (216), and storage (217), for example, via a conventional bus system. Memory (216) and storage (217) may also be coupled via a conventional bus system. Memory (216) can be any conventional electronic memory device including any hierarchical memory structure including physical memory, virtual memory or swap disk memory, and/or mass storage. According to the invention, memory requirements (216) are significantly reduced, thus memory swapping (219) (from physical memory (216) closely associated with the processor (214)) to other types of memory (e.g., virtual memory, swap disk, etc.) is minimized and the application program execution time significantly decreased. Storage (217) may be any conventional storage device for storing electromagnetic signals such as a hard disk, mass storage unit, and/or possibly a swap disk for temporal storage of the internal memory (virtual memory) (219).

Within the memory (217) and/or storage (216), resides the computer code for optimizer (20) and transformation engine (130), and data for the application to run. Optionally, simulator (160) and specification environment (10) may be co-located in the same computing system (210). User interface and user interface software (34) may variously comprise conventional user interface components such as a mouse, keyboard, batch files/computer code, touch screen, and/or monitor, and is connected to the computing system (210) via conventional input/output channels. The connections between the various modules (10, 20, 130, 160) in the embodiment of the invention illustrated in FIG. 11 are only representative. Actual data transfer and connection is preferably performed according to instructions issued from the processor (214) and uses memory (216) as an intermediate step. The specification code (14) is sent to the transformation engine (130). The code to be optimized (16) is sent to the optimizer (20). The optimizer produces a transformation script (120) which is used by the transformation engine (130) to produce optimized code (150). The optimizer (20) also produces memory directives (116) which are given to the simulator and/or compiler (160, 162). Memory directives (116) and optimized code (150) are used to generate optimized code in a target machine code language (162, 164). The latter contains instructions which are then executed on the processor (214) to simulate the application data. This data generally initially resides in storage (217), but are gradually entered into memory (216) to be processed (214) and returned to storage (217). One of the main purposes of the invention is to reduce the amount of data to transfer/exchange between the storage (217) to the memory (216), thereby reducing the swap time.

Below is an example application of the present invention on a simplistic digital system design. The basic flow of the problem and solution is presented. The example scenario uses one embodiment of the invention which takes Silage code as input and has software components known as MASAI (the optimizer (20)), SynGuide (the transformation engine (130) and code selection (14)), and S2C (for software compilation (162)). The example herein is not intended to limit the scope of the claims in any way.

First a conventional scenario using standard practices is described. The system application description is a simple basic subtask that could be part of a complex digital signal processing system design. The input is a two dimensional signal MATR which has N rows and M columns. N and M are parameters which should be instantiated before starting the simulation and optimization. The function to perform in the subtask is to sum up all the values appearing in a matrix row, and this for each row. Next, each of these row sums is accumulated to produce a final sum SUM[N]. The resulting value is also the output OUT of the subtask. Silage code (or any other data-flow specification language) could be written to represent behavior of a design with the above described functionality as depicted below.

```
01:  func main (matr: fix<64,0>[N+1][M+1]) out: fix<64,0> =
02:  begin
03:    sum[0] = fix<64,0>(0);
04:    (i : 1 . . . N) :: col[i][0] = fix<64,0>(0);
05:    (i : 1 . . . N) ::
06:      (j : 1 . . . M) ::
07:        col[i][j] = col[i][j–1] + matr[i][j];
08:    (k : 1 . . . N) ::
09:      sum[k] = sum [k–1] + col[k][M];
10:    out = sum[N];
11:  end;
```

After instantiation for e.g. N=10000 and M=10, the code below is produced.

```
01: func main (matr: fix<64,0>[10000 +1][10 +1]) out: fix<64,0> =
02: begin
03:   sum[0] = fix<64,0>(0);
04:   (i : 1 . . . 10000 ) :: col[i][0] = fix<64,0>(0);
05:   (i : 1 . . . 10000 ) ::
06:    (j : 1 . . . 10 ) ::
07:      col[i][j] = col[i][j-1] + matr[i][j];
08:   (k : 1 . . . 10000 ) ::
09:      sum[k] = sum[k-1] + col[k][10 ];
```

-continued

```
10:   out = sum[10000 ];
11: end;
```

In order to be able to simulate the behavior of the initial Silage code on a workstation, the compiled code simulator S2C (162) is used. S2C generates a C program that has an equivalent behavior as intended by the Silage code with N=10000 and M=10. The produced C code is then compiled with a C compiler (166). The resulting program (executable) (168) is then executed in order to simulate the Silage code for a given set of input stimuli (not shown here). If S2C is invoked with the option -i (for inplace mapping), the multi-dimensional signal "col" requires 10000 storage locations as shown in the output below.

```
beluga 231 > s2c -fi matr_sum
Parsing.
Signal Flow Graph Construction.
Manifest Bounds Calculation.
Type Deduction.
Conditional delay check.
Symbolic Simulation.
Checking of the delay's.
Inplace Reduction.
In function main there are 110011 scalar alive at startup.
Maximum needed scalars for this ordering = 10001
Nr. of scalars still alive (outputs) = 1
   . . . in function main
      Array col    Max. Alive = 10000
      Array sum is reduced to a scalar.
Process Partitioning.
```

In practice N may have been much larger. Generally, when N is increased, more signals need to be stored by the simulator, thus the required (physical) memory increases drastically. For very large values of N (typically above a few hundred thousand) this leads to an infeasible simulation run due to the lack of physical memory.

The declaration of variables to store the content of the signals of the design is listed too:

```
Sig_Type col_7[10001][11],
   sum_9[10001];
```

An excerpt of the C program simulating the initial design without optimization is listed below:

```
01: FixAssign (c11, sum_9[0]);
02: for (i_8=(1); i_8<=(10000); i_8++) {
03:   FixAssign (c10, col_7[i_8][0]);
04: }
05: for (i_6=(1); i_6<=(10000); i_6++) {
06:   for (j_5=(1); j_5<=(10); j_5++) {
07:     FixPlus (col_7[i_6][j_5-1)], 64,0,matr_2[i_6][j_5], 64,0,
08:     col_7[i_6][j_5], 64,0);
09:   }
10: }
11: for (k_4=(1); k_4<=(10000); k_4++) {
12:   FixPlus (sum_9[(k_4-1)], 64,0, col_7[k_4][10], 64,0, sum_9[k_4], 64,0);
13: }
14: FixAssign (sum_9[10000], (*p_out_3));
```

The order of the calculations in the code above is the same as that of the initial description. In other words, the order of execution is lexicographical, i.e., the order of definitions in the Silage description is the same as the order in the C code. However, if the order of execution is optimized by manipulating the control flow, memory requirements for simulation can be reduced. This is realized with the present invention as embodied in a combination of the optimization environment MASAI and the transformation environment SynGuide.

First, the initial Silage description is giving as input to SynGuide. There, the relevant part of the code for optimization is selected. In this simple example it is assumed that this is the entire code. This selected Silage code is then sent to MASAI. Running MASAI will lead to the following output which is explained below.

```
> masai -T -P -v matr_sum > x
Loading LIB (oprs-opns) from:
/usr/nfs/daphne_users/vsdm/petroni/cathedral/LIBs/
mpLIB_v0/bin/DECRISCbin/mpLIB_v0.dat
   Checking presence of predefined LIB operators.
   Checking presence of predefined LIB operations.
Reading DSFG from: matr_sum.sfg
Warning: input without stl: matr_2 inp typ=(int tc 64) ran=(10001 11 ) scp=(main);
Warning: output without stl: out_10 typ=(int tc 64) sik=out
Starting classification
Starting classification of Signal Indices
Starting atomizer
Starting signalization
EXTRACTING NODE SPACES FOR SPACE 0 WITH 4 ATOMS
4,3,2,1,
EXTRACTING OPERATION/OPERAND SPACES
4,3,2,1,
SPACE 0 HAS 3 SIGNIFICANT ATOMS.
GRAPH CONSTRUCTION
WRITING DSFG
WRITING PDG
```

-continued

```
WRITING DAG
NODE SPACE PLACEMENT
Procedural or Optimized placement ? (0/1) : 1
UPDATING NODE ORDERS
PLACE : 0->   Node: 1->   ORDER: 0
PLACE : 1->   Node: 0->   ORDER: 1
PLACE : 2->   Node: 2->   ORDER: 2
Do you want to modify the default node order? (y/n):n
placed: 3,.placed: 2,.placed: 1,
WRITING PLACEMENT RESULT IN CODE
WRITING PLACEMENT PDG
SELECTING PARTIAL ORDERING
WRITING ORDERED RESULT IN CODE
```

As one of the first steps, a pruning of scalar signals is performed (during the classification). This will lead to the identification of only 3 relevant multi-dimensional signals:

```
01: (i : 1 ... 10000 ) :: col[i][0] = fix<64,0>(0);
02: (i : 1 ... 10000 ) ::
03: (j : 1 ... 10 ) ::
04:   col[i][j] = col[i][j-1] + matr[i][j];
05: (k : 1 ... 10000 ) ::
06:   sum[k] = sum[k-1] + col[k][10 ];
```

Then the Polyhedral Dependency Graph (PDG) is extracted from this flow graph, leading to three definition domains, and three operand domain polytopes, and a number of affine dependence relations. These are combined in a PDG graph model during GRAPH CONSTRUCTION. The PDG contains 3 nodes. They are umbered from 0 to 2. Each PDG node is attributed with a node space, definition space(s) and operand space(s). The definition and operations spaces are only implicitly used to calculate the affine relation between the nodes. Node 0 is derived from line 01 in code above. The node is attributed with the following node space:

$$\begin{bmatrix} 0 & 1 \\ 0 & -1 \\ 1 & 0 \\ -1 & 0 \end{bmatrix} * I >= \begin{bmatrix} 0 \\ 0 \\ 0 \\ -10000 \end{bmatrix}$$

(where I is a two dimensional iteration vector)
For clarity, the matrix formula is worked out to obtain the following set of inequalities:

$$0 * i\_0 + 1 * i\_1 >= 0$$

$$0 * i\_0 + -1 * i\_1 >= 0$$

$$1 * i\_0 + 0 * i\_1 >= 0$$

$$-1 * i\_0 + 0 * i\_1 >= -10000$$

The inequalities are mathematically equivalent to:
  i_0=0 and 1<=i_1 <=10000
Node 1 is derived from line 3 to 5 in the code above as:

$$\begin{bmatrix} 1 & 0 \\ -1 & 0 \\ 0 & 0 \\ 0 & -1 \end{bmatrix} * I >= \begin{bmatrix} 1 \\ -10000 \\ 1 \\ 10 \end{bmatrix}$$

Node 2 corresponds to line 5 to 6 in the code above and has as node space:

$$\begin{bmatrix} 0 & 1 \\ 0 & -1 \\ 1 & 0 \\ -1 & 0 \end{bmatrix} * I >= \begin{bmatrix} 0 \\ 0 \\ 1 \\ -10000 \end{bmatrix}$$

There are 4 arcs in the PDG numbered from 0 to 3. All arcs are attributed with an affine relation A*I+B.
Arc 0 goes from node 1 to node 0. Attributed affine relation:

$$\begin{bmatrix} 1 & 0 \\ 0 & 1 \end{bmatrix} * I + \begin{bmatrix} 0 \\ -1 \end{bmatrix}$$

Arc 1 goes from node 1 to node 1. Attributed affine relation:

$$\begin{bmatrix} 1 & 0 \\ 0 & 1 \end{bmatrix} * I + \begin{bmatrix} 0 \\ -1 \end{bmatrix}$$

Arc 2 goes from node 2 to node 1. Attributed affine relation:

$$\begin{bmatrix} 1 & 0 \\ 0 & 0 \end{bmatrix} * I + \begin{bmatrix} 0 \\ 10 \end{bmatrix}$$

Arc 3 goes from node 2 to node 2. Attributed affine relation:

$$\begin{bmatrix} 1 & 0 \\ 0 & 0 \end{bmatrix} * I + \begin{bmatrix} -1 \\ 0 \end{bmatrix}$$

Finally, the optimization method is started, including both a polytope placement and a ordering step. The placement can be skipped by interpreting the original code in a "procedural" way or it can be "optimized". In the latter case, the way the polytopes are tackled (one by one) can be steered manually by entering other polytope (node) orderings. The output is shown below.

```
01: % masai -P -T -v matr_sum > x
02: Loading LIB (oprs-opns) from:
03: /usr/nfs/daphne users/vsdm/petroni/cathedral/LIBs/
04: mpLIB_v0/bin/DECRISCbin/mpLIB_v0.dat
05:   Checking presence of predefined LIB operators.
06: Checking presence of predefined LIB operations.
07: Reading DSFG from: matr_sum.sfg
08: Warning: input without stl: matr_2 inp typ=(int tc 64) ran=(10001 11
)
scp=(main);
09: Warning: output without stl: out_10 typ=(int tc 64) sik=out
10: Starting classification
11: Starting classification of Signal Indices
12: Starting atomizer
13: Starting signalization
11: EXTRACTING NODE SPACES FOR SPACE 0 WITH 4 ATOMS
11: 4,3,2,1,
11: EXTRACTING OPERATION/OPERAND SPACES
11: 4,3,2,1,
11: SPACE 0 HAS 3 SIGNIFICANT ATOMS.
11: GRAPH CONSTRUCTION
20:
21: WRITING DSFG
22: WRITING PDG
23: WRITING DAG
```

-continued

```
24: NODE SPACE PLACEMENT
25: Procedural or Optimized placement ? (0/1): 1
26: UPDATING NODE ORDERS
27:
28: PLACE: 0->   Node: 1->   ORDER: 0
29: PLACE: 1->   Node: 0->   ORDER: 1
30: PLACE: 2->   Node: 2->   ORDER: 2
31: Do you want to modify the default node order? (y/n) :y
32: This PDG contains 3 nodes.
33: Enter for each node number your order number.
34: After each update the dag-file is updated.
35:
36: Give Node number to modify [0 . . . 2]:2
37: Enter new order number for Node: 2:0
38: RE-UPDATING NODE ORDERS
39:
40: Do you want to modify an other node? (y/n):n
41: PLACE: 0->   Node: 2->   ORDER: 0
42: PLACE: 1->   Node: 1->   ORDER: 1
43: PLACE: 2->   Node: 0->   ORDER: 2
44: placed: 3, . . . placed: 2,.placed: 1,
45: WRITING PLACEMENT RESULT IN CODE
46: WRITING PLACEMENT PDG
47: SELECTING PARTIAL ORDERING
48: WRITING ORDERED RESULT IN CODE
```

As shown in the screen output above, at line 31 the question "Do you want to modify the default node order?" is answered affirmative. In line 36 and 37, one can see the designer specified that she/he wants to change the order of node 2 to 0. This means that node 2 will now be placed first. This is made clear in the updated ordering from line 41 to 43.

MASAI generates a list with transformations that manipulate the control flow. This file is shown below:

```
01: Open("matr_sum.sil","program","No")!
02: doselect("iterator","1")!
03: dotrans("total_body_split",0," ")!
04: doselect ("iterator","2")!
05: dotrans("affine",6,"1 0 0 1 0 0 ")!
06:
07: doselect ("iterator","1")!
08: dotrans("affine",6,"1 0 0 1 0 0 ")!
09:
10: doselect("iterator","3")!
11: dotrans("affine",6,"1 0 0 1 0 1 1 ")!
12:
13: doselect("iterator","2")!
14: dotrans("affine",6,"1 0 0 1 -1 0 ")!
15:
16: doselect("iterator","3")!
17: dotrans("affine",6,"1 0 0 1 -1 0 ")!
18:
19: doselect("iterator","1")!
20: dotrans("affine",6,"1 0 0 1 -1 0 ")!
21:
22: doselect("iterator","1")!
23: dotrans("total_body_merge",2,"2 3")!
24: Save_as("Text","matr_sum_out.sil");
```

The transformations listed in above are sent to the tool SynGuide (transformation engine (130) and one by one executed by it. The resulting optimized Silage code is shown below:

```
01: func main(
02:    matr:fix<64,0>[10001][11])
03:    out:fix<64,0> =
04:
05: begin
06:    sum[0]=fix<64,0>(0);
07:    i : 0 . . . 9999)::
08:    begin
09:       (T0 : 0 . . . 11)::
10:       begin
11:
12:          col[i + 1][0] = if (T0 == 0)
13:             ->fix<64,0>(0)
14:          fi;
15:          col[i + 1][T0] = if ((10 >= T0) & (T0 >= 1))
16:             ->col[i + 1][T0 + -1] + matr[i + 1][T0]
17:          fi;
18:          sum[i + 1] = if (T0 == 11)
19:             ->sum[i] + col[i + 1][10]
20:       fi;
21:       end;
22:       end;
23:       end;
24:       out= sum[10000];
25: end;
```

The optimized Silage code above is translated to C with the simulator compiler S2C. The output of the translator is given below:

```
>s2c -fi matr_sum
Parsing.
Signal Flow Graph Construction.
Manifest Bounds Calculation.
Type Deduction.
Conditional delay check.
Symbolic Simulation.
Checking of the delay's.
Inplace Reduction.
In function main there are 110011 scalar alive at startup.
Maximum needed scalars for this ordering = 2
Nr. of scalars still alive (outputs) = 1
. . . in function main
   Array col is reduced to a scalar.
   Array sum is reduced to a scalar.
Process Partitioning.
```

Within the resulting C file, the declaration statement for memory allocation looks like:

Sig_Type col_4, sum_7;

Note, that instead of a declaration of a multidimensional signal of 10000 instances of Sig_type, only a single variable instance (i.e., a scalar) is needed.

An excerpt of the C code that executes the basic functionality of the initial Silage description is generated as:

```
01: FixAssign (c9, sum_7);
02: for (i_6=(0); i_6<=(9999); i_6++) {
03:    for (T0_5=(0); T0_5<=(11); T0_5++) {
04:       if ((T0_5==0)) {
05       FixAssign (c8, col_4);
06:    }
07:    if (((10>=T0_5))&&((T0_5>=1))) {
08:       FixPlus (col_4,64,0,matr_2[(i_6+1)][T0_5],64,0,col_4,64,0);
09:    }
11:    if ((T0_5==11)) {
12:       FixPlus (sum_7,64,0,col_4,64,0,sum_7,64,0);
13:    }
14: }
15: }
16: FixAssign (sum_7,(*p_out_3));
```

MASAI also calculates relative lifetimes of all the signals. Based on these lifetimes, memory directives for the compiled code simulator S2C are generated by MASAI. For the initial Silage description, the following directives are generated.

01: INPLACE main col;
02: INPLACE main sum;

With these directives, S2C can directly generate C code that requires significantly less memory than the unoptimized C code.

For further detail see Ch. 5 and 6 of Michael Van Swaaij, "Data Flow Geometry; Exploiting Regularity in System-level Synthesis", Ph.D. thesis, Katholieke Universiteit, Leuven, Faculteit Toegepaste wetenschappen, December, 1992 as appended hereto.

We claim:

1. A processor-implemented method for optimizing code, including operations on multi-dimensional signals, said method comprising the steps of:
    generating from said code a polyhedral dependency graph description wherein a first code portion, a second code portion, and their associated dependencies are represented, said graph having nodes and arcs, said arcs representing said dependencies, said nodes comprising node domains and representing said first and said second code portions; and
    mapping each code portion representation to a common representation according to an associated function, wherein a first substep of ordering said node domains for individual mapping and a second substep of placing the ordered node domains are included, said second substep being executed in a non-static way based on the ordering being determined in said first substep.

2. The optimization method of claim 1 wherein the code comprises a signal processing specification.

3. The optimization method of claim 1 wherein the code comprises a numerical processing specification.

4. The optimization method of claim 1 wherein the code portion representation comprises a node domain.

5. The optimization method of claim 1 wherein the code portion representation comprises one or more operand domains.

6. The optimization method of claim 1 wherein the code portion representation comprises one or more definition domains.

7. The optimization method of claim 1 wherein the function varies according to the dependencies of the code portion representation.

8. The optimization method of claim 1 wherein the function varies according to a dependency angle of the code portion representation.

9. The optimization method of claim 1 wherein the function varies according to a dependency variance of the code portion representation.

10. The optimization method of claim 1 wherein the function varies according to a dependency length of the code portion representation.

11. The optimization method of claim 1 wherein the function varies according to the number of dependencies in the code portion representation.

12. The optimization method of claim 1 wherein the function comprises an affine transformation function represented by Ax+b.

13. The optimization method of claim 1 wherein the function comprises a unimodular transformation matrix.

14. The optimization method of claim 1 wherein the function comprises a matrix entry that is determined by solving an optimization function.

15. The optimization method of claim 14 wherein the matrix entry is further determined by solving a constraint function.

16. The optimization method of claim 15 wherein the matrix entry is determined by using a branch-and-bound technique.

17. The optimization method of claim 16 wherein the matrix entry is determined by using a tight lower bound to reduce the search space.

18. The optimization method of claim 1 wherein the function comprises an offset coefficient that is determined by solving an optimization function.

19. The optimization method of claim 18 wherein the the offset coefficient is further determined by solving a constraint function.

20. The optimization method of claim 19 wherein the offset coefficient is determined by using an integer linear programming formulation.

21. The optimization method of claim 1 wherein the mapping step is constrained by a constraint function.

22. The optimization method of claim 21 wherein the constraint function varies according to constraints imposed by code portion representations in the common representation.

23. The optimization method of claim 21 wherein the constraint function varies according to a linear ordering of the code portion representations in the common representation.

24. The optimization method of claim 21 wherein the constraint function varies according to data routing information between a code portion representation and a code portion representation in the common representation.

25. The optimization method of claim 21 wherein the constraint function varies according to a restricted search space.

26. The optimization method of claim 21 wherein the constraint function varies according to user-defined mapping constraints.

27. The optimization method of claim 1 further comprising the step of:
    creating an ordered common representation wherein an ordering vector maps the common representation onto an ordering axis.

28. The method of claim 27 further comprising the step of:
    creating an optimized code based on the common representation and the ordered common representation.

29. The method of claim 27 wherein the ordering axis comprises a 1-dimensional ordering axis.

30. The optimization method of claim 27 wherein the ordering step further comprises the steps of:
    collecting all intra- and inter-dependency vectors in the common representation into a plurality of dependency cone rays;
    projecting all dependencies in the common representation on the dependency cone rays;
    calculating a dependency cost for each dependency cone ray;
    selecting a set of maximal cost dependency cone rays;
    forming a ray base from the set of selected maximal cost dependency cone rays;
    computing a base transformation of the ray base; and
    applying the base transformation to the common representation to create a ordered common representation.

31. The optimization method of claim 30 wherein the computing step is constrained by user-defined constraints.

32. The optimization method of claim 27 further comprising the step of: determining certain characteristics of the ordered common representation.

33. The optimization method of claim 32 wherein a lifetime of a signal in the ordered common representation is determined.

34. The optimization method of claim 32 wherein a size of a signal in the ordered common representation is determined.

35. The optimization method of claim 32 wherein a maximum number of life signals simultaneously alive is determined for the ordered common representation.

36. The optimization method of claim 32 wherein the number of integer points within polytopes contained in the ordered common representation at the extreme points of the ordered common representation is determined.

37. The optimization method of claim 1 wherein the generating step further comprises a first step of:
  selecting a portion of a code, wherein the selected portion of code comprises multi-dimensional signals.

38. The optimization method of claim 1 wherein the generating step further comprises a first step of:
  generating a signal flow description from a code, wherein the signal flow description is based on the syntactical structure of the code.

39. The optimization method of claim 38 further comprising the step of:
  pruning the signal flow description, wherein multi-dimensional signals are included in the pruned signal flow description.

40. The optimization method of claim 38 further comprising the step of:
  abstracting signals in the signal flow description.

41. The optimization method of claim 38 further comprising the step of:
  abstracting operations in the signal flow description.

42. The optimization method of claim 1, following the generating step, further comprising the step of:
  modifying the dependency description wherein dependencies within a code portion representation are split.

43. The optimization method of claim 27, further comprising the step of:
  generating a script wherein the script is based on the code portion representation functions and the ordered common representation.

44. The optimization method of claim 43 wherein the script comprises an affine transformation wherein a unimodular affine transformation is performed when applied to the code.

45. The optimization method of claim 43 wherein the script contains a total-body-split transformation wherein all statements in a body of a loop are split when the transformation is applied to the code.

46. The optimization method of claim 43 wherein the script contains a Ndim-body-merge transformation wherein two loops are merged into one loop when the transformation is applied to the code.

47. The optimization method of claim 43, further comprising the step of:
  creating an optimized code by applying the script to the code.

48. The optimization method of claim 47, further comprising the step of:
  generating target code based on the optimized code.

49. The method as recited in claim 1, wherein said first and said second substep are executed substantially simultaneously thereby achieving a dynamic mapping.

50. The method as recited in claim 1, wherein said step of mapping each code portion representation further comprises a substep of splitting said node domains where after said first and said second substep are executed.

51. The method as recited in claim 50, wherein said step of splitting said node domains is executed in such a way that the resulting domains having an intra-dependency cone that is within a single orthant.

52. A computing system for optimizing a code including operations on multi-dimensional signals, the system comprising:
  a processor for executing programmed instructions and for storing and retrieving data;
  a memory unit coupled to the processor for storing program instruction steps and data for execution by the processor;
  a dependency description generator coupled to the processor for generating a polyhedral dependency graph description in which a first code portion, a second code portion, and their associated dependencies are represented, said graph having nodes and arcs said arcs representing said dependencies, said nodes comprising node domains and representing said first and said second code portions; and
  an optimizer coupled to the processor for optimizing the placement of each code portion representation in a common representation in which the placement of each code portion representation in the common representation is described by a mapping function, wherein a first substep of ordering said node domain for individual mapping and a second substep of placing the ordered node domains are included, said second substep being executed in a non-static way based on the ordering being determined in said first substep.

53. The computing system of claim 52 further comprising:
  a specification environment coupled to the processor for producing the code.

54. The computing system of claim 52 further comprising:
  an order optimizer coupled to the processor for ordering the common representation wherein an ordering vector maps the common representation onto an ordering axis to create an ordered common representation and a set of memory directives.

55. The computing system of claim 54 further comprising:
  a code generator coupled to the processor for generating a target code based on the set of memory directives.

56. The computing system of claim 54 further comprising:
  a transformation engine coupled to the processor for transforming the code into optimized code wherein transformations based on the common representation and the ordered common representation are applied to the code.

57. The computing system of claim 56 further comprising:
  a code generator coupled to the processor for generating a target code based on the optimized code.

58. The computing system of claim 52 wherein the polyhedral dependency graph description comprises nodes and arcs, the nodes comprising node domains representing definition domains and operand domains.

59. The system as recited in claim 52, wherein said first and said second substep are executed substantially simultaneously thereby achieving a dynamic mapping.

60. The system as recited in claim 52, wherein said mapping function further comprises a substep of splitting said node domains where after said first and said second substep are executed.

61. The system as recited in claim 60, wherein said substep of splitting said node domains is executed in such a way that the resulting domains having an intra-dependency cone that is within a single orthant.

62. In a computing system having a processor for executing programmed instructions, an optimized code generated by the processor in accordance with the method comprising:

generating from a code a polyhedral dependency graph description in which a first code portion, a second code portion, and their associated dependencies are represented, wherein the code includes operations on multi-dimensional signals;

mapping each code portion representation to a common representation according to an associated function;

creating an ordered common representation wherein an ordering vector maps the common representation onto an ordering axis; and generating the optimized code based on the common representation and the ordered common representation.

63. The computing system of claim 62 wherein the polyhedral dependency graph description comprises nodes and arcs, the nodes comprising node domains representing definition domains and operand domains.

64. The computing system of claim 62, further comprising the optimization step of determining certain characteristics of the ordered common representation prior to generating the optimized code.

65. A processor-implemented method for optimizing a code, the method comprising the steps of:

generating from the code a polyhedral dependency graph description in which a first code portion, a second code portion, and their associated dependencies are represented, wherein the code includes operations on multi-dimensional signals;

modifying the polyhedral dependency graph description wherein dependencies within a code portion representation are split;

mapping each code portion representation to a common representation according to an associated function;

mapping each code portion representation to an ordered common representation wherein an ordering vector maps the common representation onto an ordering axis; and creating an optimized code based on the common representation and the ordered common representation.

66. The optimization method of claim 65 wherein the polyhedral dependency graph description comprises nodes and arcs, the nodes comprising node domains representing definition domains and operand domains.

67. The optimization method of claim 65 wherein the generating from the code a polyhedral dependency graph description step comprises the steps of:

selecting a portion of a code, wherein the selected portion of code comprises multi-dimensional signals;

generating a signal flow description from a code, wherein the signal flow description is based on the syntactical structure of the code;

pruning the signal flow description, wherein multi-dimensional signals are included in the pruned signal flow description; and abstracting signals and operations in the signal flow description.

68. The optimization method of claim 65 where the mapping to the ordered common representation step comprises the steps of:

collecting all intra- and inter-dependency vectors in the common representation into a plurality of dependency cone rays;

projecting all dependencies in the common representation on the dependency cone rays;

calculating a dependency cost for each dependency cone ray;

selecting a set of maximal cost dependency cone rays;

forming a ray base from the set of selected maximal cost dependency cone rays;

computing a base transformation of the ray base;

applying the base transformation to the common representation to create an ordered common representation.

69. A processor-implemented method for optimizing code, including operations on multi-dimensional signals, said method comprising the steps of:

generating from said code a polyhedral dependency graph description wherein a first code portion, a second code portion, and their associated dependencies are represented, said graph having nodes and arcs, said arcs representing said dependencies, said nodes comprising node domains and representing said first and said second code portions; and mapping each code portion representation to a common representation according to an associated function, wherein a first substep of ordering said node domains for individual mapping and a second substep of placing the ordered node domains are included, said second substep being executed in a non-sequential way based on the ordering being determined in said first substep.

70. The method as recited in claim 69, wherein said first and said second substep are executed substantially simultaneously thereby achieving a dynamic mapping.

71. The method as recited in claim 69, wherein said step of mapping each code portion representation further comprises a substep of splitting said node domains where after said first and said second substep are executed.

72. The method as recited in claim 71, wherein said step of splitting said node domains is executed in such a way that the resulting domains having an intra-dependency cone that is within a single orthant.

73. A processor-implemented method for optimizing code, including operations on multi-dimensional signals, said method comprising the steps of:

generating from said code a polyhedral dependency graph description wherein a first code portion, a second code portion, and their associated dependencies are represented, said graph having nodes and arcs, said arcs representing said dependencies, said nodes comprising node domains and representing said first and said second code portions; and mapping each code portion representation to a common representation according to an associated function in a non-heuristic way using a non-linear solver.

74. A computing system for optimizing a code including operations on multi-dimensional signals, the system comprising:

a processor for executing programmed instructions and for storing and retrieving data;

a memory unit coupled to the processor for storing program instruction steps and data for execution by the processor;

a dependency description generator coupled to the processor for generating a polyhedral dependency graph description in which a first code portion, a second code portion, and their associated dependencies are represented, said graph having nodes and arcs, said arcs representing said dependencies, said nodes comprising node domains and representing said first and said second code portions; and an optimizer coupled to the processor for optimizing the placement of each code portion representation in a common representation in which the placement of each code portion representation in the common representation is described by a mapping function, wherein a first substep of ordering said node domain for individual mapping and a second substep of placing the ordered node domains are included, said second substep being executed in a non-sequential way based on the ordering being determined in said first substep.

75. The method as recited in claim 74, wherein said first and said second substep are executed substantially simultaneously thereby achieving a dynamic mapping.

76. The method as recited in claim 74, wherein said step of mapping each code portion representation further comprises a substep of splitting said node domains where after said first and said second substep are executed.

77. The method as recited in claim 76, wherein said step of splitting said node domains is executed in such a way that the resulting domains having an intra-dependency cone that is within a single orthant.

78. A computing system for optimizing a code including operations on multi-dimensional signals, the system comprising:

a processor for executing programmed instructions and for storing and retrieving data;

a memory unit coupled to the processor for storing program instruction steps and data for execution by the processor;

a dependency description generator coupled to the processor for generating a polyhedral dependency graph description in which a first code portion, a second code portion, and their associated dependencies are represented, said graph having nodes and arcs, said arcs representing said dependencies, said nodes comprising node domains and representing said first and said second code portions; and an optimizer coupled to the processor for optimizing the placement of each code portion representation in a common representation in which the placement of each code portion representation in the common representation is described by a mapping function, wherein the mapping function is executed in a non-heuristic way using a non-linear solver.

* * * * *